(12) United States Patent
Nakamura

(10) Patent No.: US 6,652,109 B2
(45) Date of Patent: Nov. 25, 2003

(54) SURFACE LIGHT EMISSION DEVICE, METHOD OF MANUFACTURING THE SAME, AND LIQUID CRYSTAL DISPLAY DEVICE

(75) Inventor: Sadao Nakamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/015,020

(22) Filed: Dec. 11, 2001

(65) Prior Publication Data

US 2002/0114150 A1 Aug. 22, 2002

(30) Foreign Application Priority Data

Dec. 14, 2000 (JP) .......................................... 2000-380740

(51) Int. Cl.[7] ........................... F21V 8/00; G02F 1/1335
(52) U.S. Cl. ............................. 362/31; 362/561; 349/63
(58) Field of Search ............................. 362/26, 27, 31, 362/330, 561; 349/61–65, 67; 385/129, 130, 901

(56) References Cited

U.S. PATENT DOCUMENTS

| | | | | |
|---|---|---|---|---|
| 5,128,842 A | * | 7/1992 | Kenmochi | 362/31 |
| 5,485,291 A | * | 1/1996 | Qiao et al. | 349/62 |
| 5,575,549 A | * | 11/1996 | Ishikawa et al. | 362/31 |
| 6,072,551 A | * | 6/2000 | Jannson et al. | 349/64 |
| 6,088,074 A | * | 7/2000 | Suzuki | 349/62 |
| 6,099,135 A | * | 8/2000 | Oda et al. | 362/31 |
| 6,104,453 A | | 8/2000 | Watanabe | 349/61 |
| 6,454,452 B1 | * | 9/2002 | Sasagawa et al. | 362/31 |

* cited by examiner

Primary Examiner—Alan Cariaso
(74) Attorney, Agent, or Firm—Brinks Hofer Gilson & Lione

(57) ABSTRACT

A surface light emitting device includes a light source and a light introduction plate having a structure for causing the light from the light source to be incident from a side end surface and to outgo from a light outgoing surface. Grooves are formed in a stripe shape on an opposing surface opposite to the light outgoing surface, and the grooves are formed deeper as they have a longer distance from the light source, and the difference between the depths of adjacent grooves is made larger as they have a distance longer from the light source. A method of manufacturing the surface light emitting device and a liquid crystal device including the surface light emitting device are also disclosed. With this arrangement, the surface light emitting device can obtain a sufficiently quantity of light at any position and the liquid crystal device can display an image in uniform brightness.

18 Claims, 14 Drawing Sheets

SURFACE LIGHT EMISSION DEVICE, METHOD OF MANUFACTURING THE SAME, AND LIQUID CRYSTAL DISPLAY DEVICE

BACKGROUND OF THE INVENTION

1. Field of the Invention

The present invention relates to a surface light emission device, a method of manufacturing the same, and a liquid crystal display device, and more specifically, to the structure of a surface light emission device that is preferably used as a front light of a liquid crystal display device.

2. Description of the Related Art

Reflection type liquid crystal display devices that display an image using sun light and illuminating light as a light source are used in mobile phones and mobile information terminals because their power consumption is small. However, the reflection type liquid crystal display device has a problem that it is very poor at a display capability in a dark place where external light is not available. To solve this problem, there are known semi-transmission/reflection type liquid crystal display devices which are arranged such that a back light is disposed to the reflection type liquid crystal display devices so that an image can be displayed in a light transmission mode by tuning on the back light at a location where external light is not available.

However, it is very difficult for the semi-transmission/reflection type liquid crystal display device to make the brightness of display in a semi-transmission mode compatible with the brightness of display in a reflection mode because it is necessary to pass the light from the back light through a reflection film composed of a metal thin film.

To cope with this problem, there have been developed liquid crystal display devices provided with a surface light emission device (front light). In this liquid crystal display device, light from a light source such as a cold-cathode tube which is introduced from a side end surface of a light introduction plate is caused to outgo from a surface thereof and illuminates the liquid crystal display device from the front surface thereof. The provision of the surface light emission device in front of the front surface of the liquid crystal display device permits an image to be displayed in a reflection mode even in a dark place similarly to a case in which external light is used.

FIG. 15 is a structural view in cross section showing an example of a liquid crystal display device having a front light in front of a liquid crystal display unit. In the figure, the liquid crystal display device 100 comprises the front light 110 and the liquid crystal display unit 120. The front light 110 comprises a light introduction plate 112 which is composed of a transparent acrylic resin and a light source 113 which is composed of a cold-cathode tube or a LED (light emitting diode) and disposed to a side end surface 112a of the light introduction plate 112. A plurality of grooves 114 are continuously formed in a stripe shape on the opposing surface 112c of the light introduction plate 112 which is opposite to the light outgoing surface 112b thereof. Each of the grooves 114 is composed of two slanting surfaces which are formed to slant with respect to the light outgoing surface 112b.

The two slanting surfaces are composed of a gentle slanting surface 114a and a steep slanting surface 114b which has a slanting angle steeper than that of the gentle slanting surface 114a, and the gentle and steep slanting surfaces 114a and 114b are alternately and continuously formed on the opposing surface 112c of the light introduction plate 112.

The liquid crystal display unit 120 is arranged such that a pair of glass substrates 121 and 122, which are opposite to each other through a liquid crystal layer 123 sandwiched therebetween, are joined together through a seal member 124. In the liquid crystal display unit 120, a reflection film 125 and a display circuit 126 are formed so as to be sandwiched between the glass substrate 121 and the liquid crystal layer 123. A display circuit 127 is formed so as to be sandwiched between the glass substrate 122 and the liquid crystal layer 123. Although not shown, the display circuits 126 and 127 include circuits for driving and controlling the liquid crystal layer 123 such as an electrode layer and an orientation film.

In the liquid crystal display device 100, the light introduction plate 112 of the front light 110 is disposed in front of the front surface (upper surface in the figure) of the display region of the liquid crystal display unit 120. The light emitted from the light source 113 is introduced to the light introduction plate 112 through the side end surface 112a thereof, is reflected by the light outgoing surface 112b and the opposing surface 112c, and travels through the inside of the light introduction plate 112. At the same time, the light is reflected by the steep slanting surface 114b, which has the steeper slanting angle, of two slanting surfaces 114a and 114b formed on the opposing surface 112c, and thereby the direction of the light is changed in a direction where the light travels to the light outgoing surface 112b and the light outgoes from the light outgoing surface 112b. The front light 110 illuminates the liquid crystal display unit 120 by the arrangement as described above. Next, the light incident on the liquid crystal display unit 120 passes through the respective display circuits 126 and 127 and the liquid crystal layer 123, reaches the reflection film 125 and is reflected thereby, and returns to the outside of the liquid crystal display unit 120 again. The reflected light passes through the front light 110 and reaches a viewer, and an image displayed on the liquid crystal display unit 120 is visually confirmed by the viewer.

According to the liquid crystal display device 100 arranged as described above, it is possible to display an image even in a dark place by turning on the front light 110, and the image can be displayed brightly at a portion near to the light source 113. However, the image is made darker at a portion thereof which is located farther from the light source 113. In a usual front light, the brightness of the portion of an image displayed at a position about 50 mm apart from the light source 113 is only about one-half that of the portion of the image displayed in the vicinity of the light source 113. Accordingly, it is only a part of the display region of the liquid crystal display device 100 that can realize a sufficient visual property in a dark place. Further, there is also a problem that the existence of the region where an image is displayed dark makes it all the more difficult to view the displayed image.

SUMMARY OF THE INVENTION

Accordingly, it is an object of the present invention, which was made to solve the above problem, to provide a surface light emission device capable of obtaining a sufficient quantity of light even at a place apart from a light source, a method of manufacturing the same, and a liquid crystal display device capable of displaying an image the brightness of which is uniform over an entire display region.

In the present invention, a means for solving the above problems is arranged as a surface light emitting device which includes a light source and a light introduction plate having a structure for causing the light from the light source to be incident from a side end surface and causing the light to outgo from a light outgoing surface, wherein a plurality of grooves each composed of a gentle slanting surface and a steep slanting surface having a slanting angle steeper than that of the gentle surface are periodically formed in a stripe shape on the opposing surface of the light introduction plate opposite to the light outgoing surface, and a groove having a larger distance from the light source of the grooves is formed deeper as well as the difference between the depths of adjacent grooves is made larger as they have a distance longer from the light source.

In the surface light emitting device of the present invention, it is preferable that the depth $H_{n+1}$ of a (n+1)-th groove from the light source of the plurality of grooves formed in the stripe shape be formed to satisfy a formula $H_{n+1} = H_n \times T/(T-H_n)$ using the depth $H_n$ of a n-th groove and the thickness T of the light introduction plate.

In the surface light emitting device of the present invention, it is preferable that the depth $H_n$ ($\mu$m) of a n-th groove from the light source of the plurality of grooves formed in the stripe shape be shown by a formula $H_n = an^2T + H_1$ using the number $n$ of the groove, a coefficient $a$, the depth $H_1$ (>m) of a first groove, and the thickness T ($\mu$m) of the light introduction plate and that the coefficient $a$ is from $1.0 \times 10^{-8}$ or more to $5.0 \times 10^{-8}$ or less.

In the surface light emitting device of the present invention, it is preferable that the depth $H_n$ ($\mu$m) of a n-th groove from the light source of the plurality of grooves formed in the stripe shape be shown by a formula $H_n = (an^2 + bn) \times T + H_1$ using the number $n$ of the groove, coefficients $a$ and $b$, the depth $H_1$ ($\mu$m) of a first groove, and the thickness T ($\mu$m) of the light introduction plate and that the coefficient $a$ is from $1.0 \times 10^{-8}$ or more to $5.0 \times 10^{-8}$ or less and the coefficient $b$ is from $1.0 \times 10^{-6}$ or more to $3.0 \times 10^{-6}$ or less.

In the surface light emitting device of the present invention, it is preferable that the depth $F_n$ of a n-th groove from the light source of the plurality of grooves formed in the stripe shape be shown by ($H_n + d$) which is the sum of an effective portion $H_n$ of the depth $F_n$ that contributes to outgoing of light and an ineffective portion other than the effective portion $H_n$ and that the depth $F_{n+1}$ of a (n+1)-th groove from the light source be shown by a formula $F_{n+1} = ((F_n - d) \times T/(T - F_n + d)) + d$ using the depth $F_n$ of the n-th groove, the thickness T of the light introduction plate, and the ineffective portion $d$.

In the surface light emitting device of the present invention, it is preferable that the reflection surface of the light introduction plate have flat portions formed between the grooves which are adjacent to each other.

In the surface light emitting device of the present invention, it is preferable that the reflection surface of the light introduction plate have flat portions formed on the bottoms of the grooves.

In the surface light emitting device of the present invention, it is preferable that the areas of the flat portions be formed so as to be gradually smaller along a light introducing direction.

In the present invention, a means for solving the above problems is arranged as a method of manufacturing a surface light emitting device, which includes a step of producing a casting mold by flatly machining one surface of a casting mold substrate at a predetermined pitch and by forming a plurality of grooves in a stripe shape to the step portions formed on the surface of the casting mold substrate by the flat machining at the pitch; a step of producing a metal mold from the casting mold; a step of producing a light introduction plate by injection molding using the metal mold; and a step of disposing a light source to the light introduction plate, wherein a groove having a larger distance from the light source of the plurality of grooves is formed deeper as well as the difference between the depths of adjacent grooves is made larger as they have a distance longer from the light source.

In the present invention, a means for solving the above problems is arranged as a method of manufacturing a surface light emitting device, which includes a step of producing a metal mold by flatly machining one surface of a metal mold substrate at a predetermined pitch and by forming a plurality of grooves in a stripe shape to the step portions formed on the surface of the metal mold substrate by the flat machining at the pitch; a step of producing a light introduction plate by injection molding using the metal mold; and a step of disposing a light source to the light introduction plate, wherein a groove having a larger distance from the light source of the plurality of grooves is formed deeper as well as the difference between the depths of adjacent grooves is made larger as they have a distance longer from the light source.

In the method of manufacturing the surface light emitting device of the present invention, it is preferable that the depth $F_n$ of a n-th groove from the light source of the plurality of grooves be shown by ($H_n + d$) which is the sum of an effective portion $H_n$ of the depth $F_n$ that contributes to outgoing of light and an ineffective portion other than the effective portion $H_n$ which is the sum of an effective portion $H_n$ of the depth $F_n$ that contributes to outgoing of light and an ineffective portion other than the effective portion $H_n$ and that the grooves be formed such that the depth $F_{n+1}$ of a (n+1)-th groove from the light source satisfies a formula $F_{n+1} = ((F_n - d)T/(T - F_n + d)) + d$ using the depth $F_n$ of the n-th groove, the thickness T of the light introduction plate and the ineffective portion $d$.

In the method of manufacturing the surface light emitting device of the present invention, it is preferable that the depths of the plurality of grooves be formed such that the depth $H_n$ ($\mu$m) of a n-th groove from the light source of the grooves satisfies $H_n = an^2T + H_1$ which is shown using the number $n$ of the groove, a coefficient $a$ from $1.0 \times 10^{-8}$ or more to $5.0 \times 10^{-8}$ or less, the thickness T ($\mu$m) of the light introduction plate, and the depth $H_1$ ($\mu$m) of a first groove.

In the method of manufacturing the surface light emitting device of the present invention, it is preferable that the depths of the plurality of grooves be formed such that the depth $H_n$ ($\mu$m) of a n-th groove from the light source of the grooves satisfies a formula $H_n = (an^2 + bn) \times T + H_1$ which is shown using the number $n$ of the groove, a coefficient $a$ from $1.0 \times 10^{-8}$ or more to $5.0 \times 10^{-8}$ or less, a coefficient $b$ from $1.0 \times 10^{-6}$ or more to $3.0 \times 10^{-6}$ or less, the thickness T ($\mu$m) of the light introduction plate, and the depth $H_1$ ($\mu$m) of a first groove.

In the method of manufacturing the surface light emitting device of the present invention, it is preferable that the grooves be formed such that flat portions are formed between the grooves which are adjacent to each other.

In the method of manufacturing the surface light emitting device of the present invention, it is preferable that the flat portions be formed such that they have a smaller area as they have a larger distance from a side where the light source is disposed.

In the present invention, a means for solving the above problems is arranged as a liquid crystal display device including the surface light emitting device.

DESCRIPTION OF THE PREFERRED EMBODIMENTS

Embodiments of the present invention will be described below with reference to the drawings. However, the present invention is not limited to the following embodiments. Further, the figures, which are referred to in the flowing embodiments, are used to describe the arrangements of the respective embodiments, and the sizes, thicknesses, and dimensions of respective components shown in the figures are different from those of an actual surface light emission device and a liquid crystal display device.

First Embodiment

Figure 1:
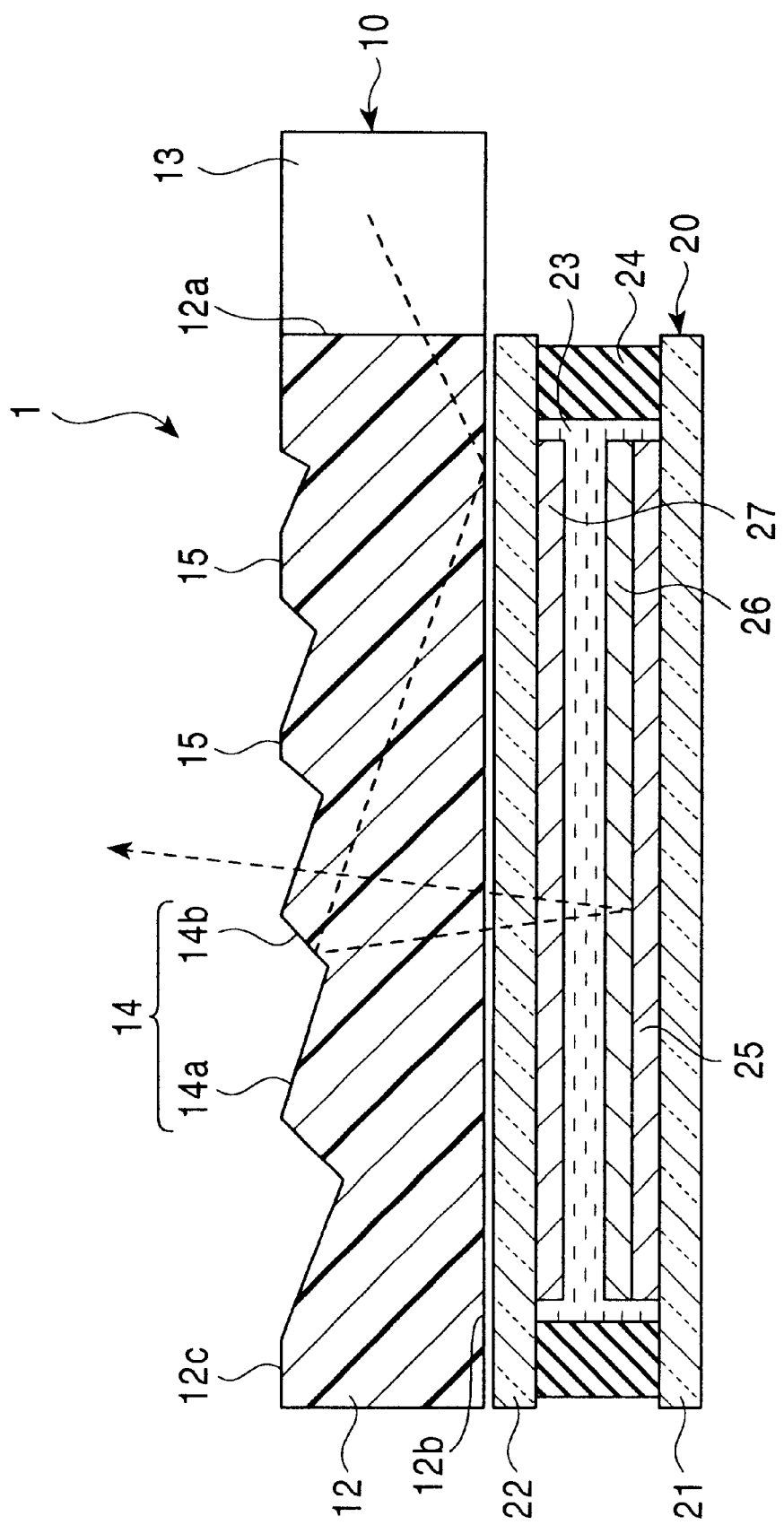
FIG. 1 is a sectional view of a liquid crystal display device of a first embodiment of the present invention.

FIG. 1 is a sectional view showing a liquid crystal display device including a front light which is a first embodiment of the present invention. The liquid crystal display device 1 shown in the figure comprises a liquid crystal display unit 20 and a front light 10 disposed in front of (above) the front surface of the liquid crystal display unit 20. The front light 10 comprises a light introduction plate 12 and a light source 13. The lower surface of the light introduction plate 12, which is opposed to the liquid crystal display unit 20, is arranged as a flat surface acting as a light outgoing surface 12b from which light outgoes.

As shown in FIG. 1, a plurality of grooves 14 are formed on the opposing surface 12c, which is opposed to the light outgoing surface 12b, of the light introduction plate 12, in a stripe shape. Each of the plurality of grooves 14 is composed of a gentle slanting surface 14a and a steep slanting surface 14b. The gentle slant surface 14a is formed so as to slant with respect to the light outgoing surface 12b; and the steep slanting surface 14b is formed continuously to the gentle slanting surface 14a and has a slanting angle steeper than that of the gentle slanting surface 14a. The plurality of grooves 14 are formed such that the depths thereof are made deeper as they are located farther from the light source 13. Further, flat portions 15 are formed between respective adjacent ones of the grooves 14 on the opposing surface 12c, and the areas of the flat portions 15 are made smaller as they are located farther from the light source 13.

It is preferable that the light introduction plate 12 be composed of a transparent resin material having a light transmittance of at least 90%. Preferably exemplified as the resin material are, for example, an acrylic resin and a cycloolefin resin. Further, a cold-cathode tube, a white LED, and an organic EL device can be preferably exemplified as the light source 13.

The plurality of grooves 14 on the opposing surface 12c in the stripe shape are formed similar to each other in a sectional plane shown in FIG. 1. That is, the gentle slanting surfaces 14a have the same slanting angle with respect to the light outgoing surface 12b as well as the steep slanting surfaces 14b also have the same slanting angle with respect thereto in all of the grooves 14. According to the present invention, even if the light introduction plate 12 is arranged simply as described above, the quantities of light outgoing from the light outgoing surface 12b can be controlled by controlling the depths of the grooves 14. Further, the simple arrangement of the light introduction plate 12 enables it to be machined accurately, and thereby an effect of more accurately controlling the quantities of outgoing light can be obtained.

The light introduction plate 12 is arranged to have the flat portions 15 between the respective ones, which are formed adjacent to each other, of the grooves 14. The formation of the flat portions 15 between the respective adjacent ones of the grooves 14 permits the flat portions 15 to act as reflection surfaces for reflecting external light on the opposing surface 12c, in addition to the gentle slanting surfaces 14a and the steep slanting surfaces 14b. Accordingly, a phenomenon that a visual property is lowered by light in a particular direction which is strongly reflected by the outer surface of the light introduction plate 12 can be suppressed. Further, the flat portions 15 are formed such that the areas thereof mare made smaller as they are located farther from the light source 13. This is because that when the flat portions 15 have the same area, the visual property is lowered by light in a particular direction which is strongly reflected by the surfaces of the flat portions 15 and the grooves 14 are liable to be viewed by a viewer because they must be deeply formed to secure the quantity of outgoing light at a position apart from the light source 13, and thereby the visual property of a displayed image is lowered because the image displayed on the liquid crystal display unit 20 is disturbed.

The liquid crystal display unit 20 is arranged such that a first substrate 21 and a second substrate 22, which are opposed to each other with a liquid crystal layer 23 sandwiched therebetween, are joined together by a seal member 24. A reflection layer 25 including a metal reflection film and a display circuit 26 are sequentially formed on the surface, which faces the liquid crystal layer 23, of the first substrate 21, and a display circuit 27 is formed on the surface, which faces the liquid crystal layer 23, of the second substrate 22. As described above, the liquid crystal display unit 20 is arranged as a reflection type liquid crystal display unit having the reflection layer 25 for reflecting light incident from the outside.

Note that the display circuits 26 and 27 include orientation films formed thereon for controlling the orientation of an electrode layer composed of a transparent conductive film for driving the liquid crystal layer 23 and the orientation of the liquid crystal layer 23, while they are not illustrated. Further, a color filter and the like may be formed on the display circuits 26 and 27 when necessary to display an image in a color.

The reflection layer 25 is arranged such that a reflection film, which is composed of a metal such as aluminum or silver, is formed on an organic film, which is composed of, for example, an acrylic resin and has an uneven shape formed on the surface thereof, by sputtering, and a flattened film composed of an acrylic resin is formed so as to cover the reflection film and the organic film. The reflection layer 25 may include a color filter, in which it is preferable that the color filter be formed just above the reflection film. With this arrangement, a color image of high quality can be displayed by reducing color drift and parallax because the color filter can be disposed on a light reflection surface.

The surface of the organic film of the reflection layer 25 of the liquid crystal display unit 20, and the shape of the reflection film formed on the organic film will be described below with reference to FIG. 2.

Figure 2:
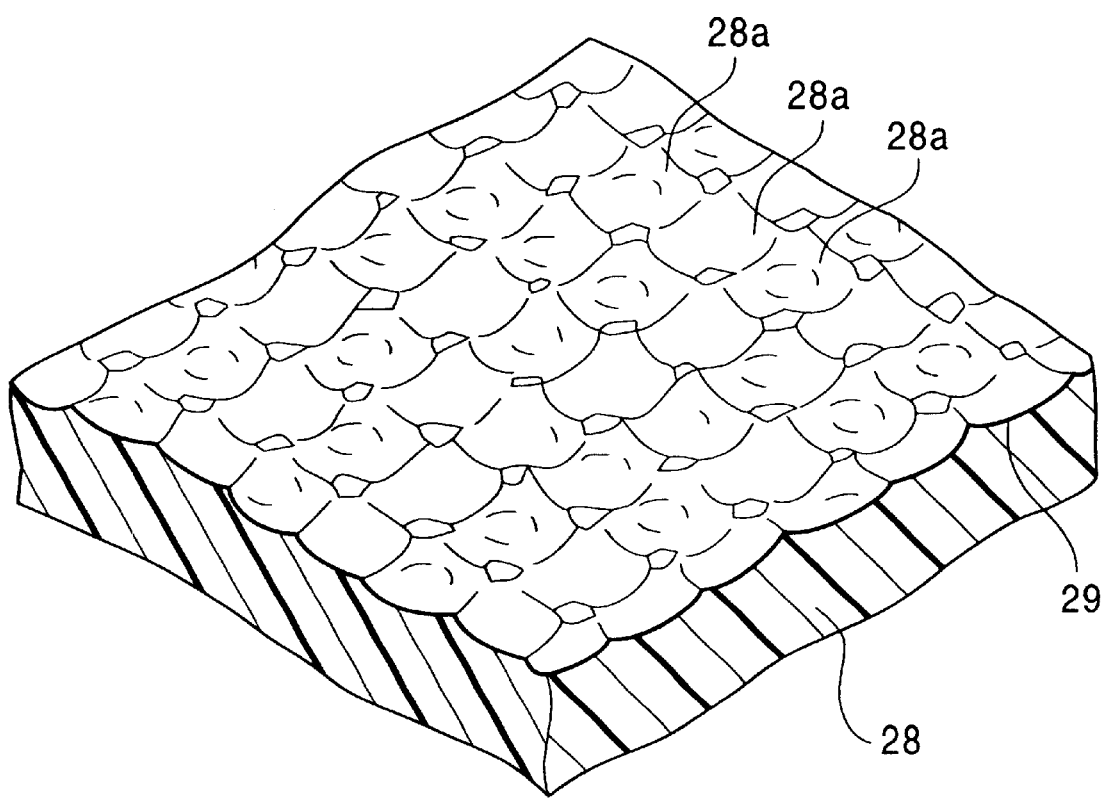
FIG. 2 is a perspective view showing a part of a reflection layer of a liquid crystal display unit according to the present invention.

FIG. 2 is a perspective view showing the organic film and the reflection film, which are formed on the reflection layer 25 of the liquid crystal display unit 20, in an enlarged fashion. In the figure, a multiplicity of recessed portions 28a, the inner surface of each of which forms a part of a spherical surface, are continuously formed on the surface of the organic film 28 so as to overlap with each other, and the reflection film 29 is formed on the organic film 28.

The organic film 28 is formed such that a resin layer composed of a photosensitive resin is formed on a substrate in a flat shape; a transfer mold, which is composed of a silicone resin and has an uneven surface shape opposite to that of the organic film 28 shown in FIG. 2, is attached to the surface of the resin layer under pressure; and then the resin layer is hardened. The reflection film 29 is formed on the surface of the organic film 28 to reflect the light incident on the liquid crystal display unit 20. It is formed of a metal material having a high reflectance such as aluminum or silver using a film forming method such as sputtering and vacuum vapor deposition.

It is preferable that the depths of the recessed portions 28a shown in FIG. 2 be formed in the range of 0.1 $\mu$m to 3 $\mu$m at random, that respective adjacent ones of the recessed portions 28a (hereinafter, simply referred to as "adjacent recessed portions 28") be disposed at a pitch of 5 $\mu$m to 100 $\mu$m at random, and that the slanting angle of the inner surface of each recessed portion 28a be set in the range of $-30°$ to $+30°$.

In particular, it is particularly important to set the distributed slanting angle of the inner surfaces of the recessed portions 28a from $-30°$ to $+30°$ and to dispose the adjacent recessed portions 28a at a random pitch with respect to all the angles of a plane. This is because that if the adjacent recessed portions 28a are disposed at a regular pitch, there is a disadvantage that reflected light is colored by the occurrence of interference color of light. Further, if the distributed slanting angle of the inner surfaces of the recessed portions 28a exceeds the range of $-30°$ to $+30°$, an image cannot be displayed brightly because reflected light diffuses at an excessively wide angle and reflection intensity lowers (that is, the diffusion angle of the reflected light becomes at least 36° in air, the peak of reflection intensity in the liquid crystal display device 1 falls, and a reflection loss increases.).

Further, when the depths of the adjacent recessed portions 28a exceed 3 $\mu$m, desired flatness cannot be obtained. This is because that when the recessed portions 28a are flattened in a post-process, the apexes of projecting portions cannot be buried with a flattening film.

When the adjacent recessed portions 28a are disposed at a pitch less than 5 $\mu$m, the manufacture of the transfer mold for forming the organic film 28 is restricted. Thus, a problem arises in that a machining time is very long, that a shape capable of obtaining desired reflection characteristics cannot be formed, and that interference light occurs. The transfer mold for forming the surface shape of the organic film 28 is produced in practical use by using a transfer mold substrate that is produced by pressing a multiplicity of diamond pressers against the substrate. Accordingly, it is preferable to set the pitch of the adjacent recessed portions 28a to 5 $\mu$m to 100 $\mu$m because it is preferable that the diameter of the extreme end of the diamond presser be 30 $\mu$m to 200 $\mu$m.

The liquid crystal display device 1 arranged as described above can display an image by turning on the front light 10 and reflecting the light therefrom by the reflection layer 25, in addition to that it can display an image in a reflection mode making use of sun light and external illumination light.

The light introduction plate 12 of the front light 10 is disposed in, front of the front surface of the display region of the liquid crystal display unit 20. The light, which is introduced to the light introduction plate 12 from the light source 13 of the front light 10 through the side end surface 12a of the light introduction plate 12, travels through the inside of the light introduction plate 12 as well as is reflected by the plurality of grooves 14 formed on the opposing surface 12c of the light introduction plate 12 so that the direction thereof is changed in a direction toward the light outgoing surface 12b. Thus, the light outgoes from the light outgoing surface 12b and illuminates the liquid crystal display unit 20. The light incident on the liquid crystal display unit 20 passes through the display circuits 26 and 27 and the liquid crystal layer 23 thereof; reaches the reflection layer 25; is reflected by the reflection film of the reflection layer 25; returns to the outside of the liquid crystal display unit 20; passes through the light introduction plate 12 and outgoes from the opposing surface 12c; and reaches the viewer. An image displayed by the liquid crystal display unit 20 is viewed by the viewer as described above.

In the front light 10 of the liquid crystal display device 1, the plurality of grooves 14, which are formed on the opposing surface 12c of the light introduction plate 12 in the stripe shape as shown in FIG. 1, are formed deeper as they are located farther from the light source 13, and the difference between the depths of respective two adjacent ones of the grooves 14 (hereinafter, simply referred to as "adjacent grooves 14") is made larger as they are located farther from the light source 13. It is preferable to determine the depths of the grooves 14 such that the depth of a (n+1)-th groove from the light source 13 satisfies the following formula (1) using the depth $H_n$ of a n-th groove and the thickness T of the light introduction plate 12.

$$H_{n+1}=H_n \times T/(T-H_n) \tag{1}$$

Figure 3:
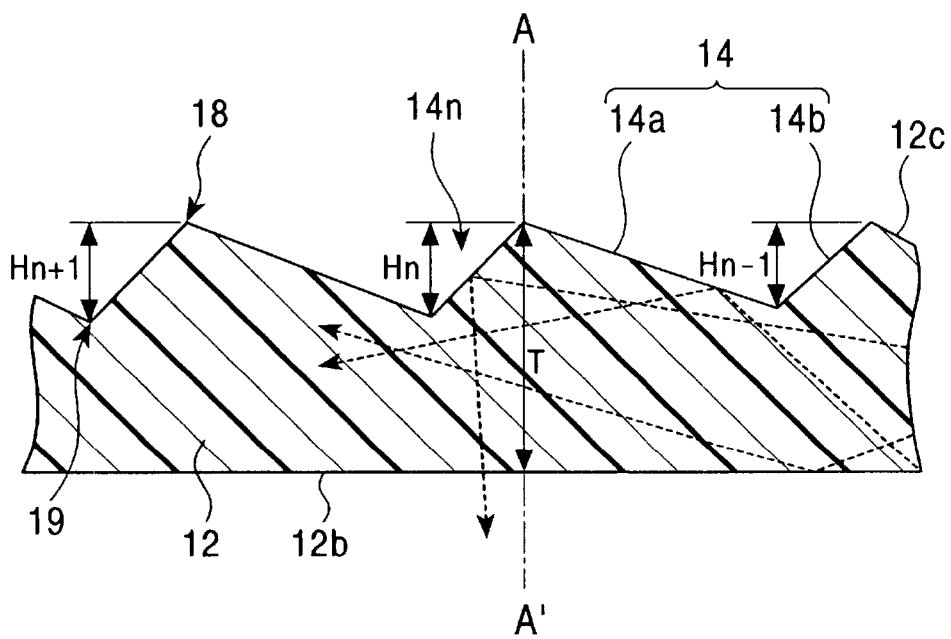
FIG. 3 is a fragmentary sectional view of a light introduction plate of a surface light emission device according to the present invention.

The formula showing the relationship between the thickness of the light introduction plate 12 and the depth of the groove 14 will be described below in detail with reference to FIG. 3. FIG. 3 is a view showing the fragmentary sectional structure of the light introduction plate 12 of the front light 10 of the example 1. In the figure, the lower surface of the light introduction plate 12 is formed in a flat surface acting as the light outgoing surface 12b from which light outgoes. Further, the grooves 14 are continuously and periodically formed on the opposing surface 12c which is opposed to the light outgoing surface 12b. Each of the grooves 14 is composed of the gentle slanting surface 14a, which slants with respect to the light introduction plate 12, and the steep slanting surface 14b which is formed to have the slanting angle steeper than that of the gentle slanting surface 14a. Further, although not shown, the light source 13 is disposed on the right side in FIG. 3, and the light from the light source 13 travels through the inside of the light introduction plate 12 from the right to the left in the figure.

In FIG. 3, the light, which outgoes from the light outgoing surface 12b of the light introduction plate 12 is the light, which is reflected by a steep slanting surface 14b of the opposing surface 12c shown in FIG. 3 and discharged from the light outgoing surface 12b. The light from the light source 13 travels through the inside of the light introduction plate 12 while being reflected by the inner surface thereof. Thus, the quantity of the light, which is reflected by the steep slanting surface 14b constituting the groove 14 of the light introduction plate 12 and outgoes from the light outgoing surface 12b, corresponds to the light which passes through the cross section of the light introduction plate 12 along the line A–A' shown in FIG. 3 and is reflected by the steep slanting surface 14b.

In FIG. 3A, the n-th groove from the light source 13 is denoted by reference numeral 14n, and the depth thereof is denoted by $H_n$. Further, the depth of the (n−1)-th groove, which is located adjacent to the groove 14n on the light source 13 side, is denoted by $H_{n-1}$, and the depth of a (n+1)-th groove, which is located adjacent to the groove 14n on the side to which light is introduced, is denoted by $H_{n+1}$. In the light introduction plate 12 shown in FIG. 3, the quantity of light, which is reflected by the steep slanting surface 14b and outgoes from light outgoing surface 12b, is shown by $L_n \times H_n/T$ using the quantity of light $L_n$, which passes through the cross section along the line A–A'0 shown in FIG. 3, and the thickness of the light introduction plate 12. Further, the quantity of light $L_{n+1}$, which is not reflected by the steep slanting surface 14b and travels in the light introducing direction, is shown by the following formula (2).

$$L_{n+1}=L_n - L_n \times H_n/T \tag{2}$$

Accordingly, the quantity of light, the direction of which is changed by the steep slanting surface 14b of the (n+1)-th groove 14, through which the light traveling in the light introduction plate 12 passes after it passes through the groove 14n, and which travels to the light outgoing surface 12b, is shown by $L_{n+1} \times H_{n+1}/T$ using the depth $H_{n+1}$ of the (n+1)-th groove 14 and the quantity of light $L_{n+1}$ described above.

From the mentioned above, it is sufficient to establish the following formula (3) in order to make the quantity of light, which is caused to outgo by the (n+1)-th groove 14, equal to the quantity of light, which is caused to outgo by the n-th groove 14.

$$L_{n+1} \times H_{n+1}/T = L_n \times H_n/T \tag{3}$$

Since $L_{n+1}=L_n-L_n \times H_n/T$ from the mentioned above, the above formula (1) is derived from these two formulas. That is, the depth of the (n+1)-th groove 14 must be deeper than that of the n-th groove 14, and specifically the depth of the former groove must be $T/(T-H_n)$ times that of the latter groove.

Further when the difference between the depth $H_{n+1}$ of the (n+1)-th groove 14 and the depth $H_n$ of the n-th groove 14 is determined from the above formulas, the difference can be shown by the following formula (4).

$$H_{n+1}-H_n=H_n^2/(T-H_n) \tag{4}$$

Further, the difference between the depth $H_n$ of the n-th groove 14 and the depth $H_{n-1}$ of the (n−1)th groove 14 can be shown by the following formula (5) from the above formulas.

$$H_n-H_{n-1}=H_n^2/(T+H_n) \tag{5}$$

As apparent from the two formulas (5) and (6), the following formula (6) can be established.

$$(H_{n+1}-H_n)>(H_n-H_{n-1}) \tag{6}$$

That is, the respective adjacent grooves 14 having a larger number n (that is, as they are located farther from the light source) must have a larger difference of depths so that a uniform quantity of light is caused to outgo by each groove.

From the mentioned above, it is sufficient to form the grooves 14 on the opposing surface 12c of the light introduction plate 12 deeper as they are located farther from the light source 13 as well as to make the difference between the depths of respective adjacent grooves 14 larger as they are located farther from the light source 13, in order to reduce the difference between the quantities of outgoing light resultant from the multiplicity of grooves 14 and to uniformly distribute the quantities of outgoing light on the light outgoing surface 12b.

More specifically, when the depths of the grooves 14 are set such that the depth $H_{n+1}$ of the (n+1)-th groove from the light source 13 satisfies the formula (1) using the depth $H_n$ of the n-th groove 14 and the thickness T of the light introduction plate 12T, it is possible to make the quantities of light resulting from the respective grooves 14, which are formed on the opposing surface 12c, uniform.

Accordingly, the light introduction plate 12 of the front light 10 of the first embodiment can make the quantities of light, which is reflected by the grooves 14 formed on the opposing surface 12c in the stripe shape and travels to the light outgoing surface 12b, uniform in all of the grooves 14. With this arrangement, the liquid crystal display device 1 provided with the front light 10 can display an image in uniform brightness on the entire surface of the display region.

Otherwise, as an arrangement in which that the grooves 14 are formed deeper as they are located farther from the light source 13 and that the difference between the depths of respective adjacent grooves 14 is made larger as they are located farther from the light source 13, it is also possible to set the depths of the grooves 14 shown in FIG. 1 such that the depth $H_n$ (μm) of the n-th groove 14 from the light source 13 satisfies the following formula (7) using the number $n$ of the groove, a coefficient $a$, the thickness T (μm) of the light introduction plate 12, and the depth $H_1$ of a first groove with the coefficient $a$ set from $1.0 \times 10^{-8}$ or more to $5.0 \times 10^{-8}$ or less.

$$H_n = an^2 T + H_1 \tag{7}$$

When the depths of the grooves 14 are set as the quadratic function of the groove number $n$ thereof as described above, the depths of the grooves 14 and the difference between the depths of respective adjacent groove 14 can be increased in correspondence to an increase in the distance thereof from the light source 13. With this arrangement, uniform quantities of outgoing light can be obtained on the light outgoing surface 12b of the light introduction plate 12, and thereby the liquid crystal display device 1 can display an image in uniform brightness.

Otherwise, the depth $H_n$ (μm) of the n-th groove 14 from the light source 13 may be set to satisfy the following formula (8) using the number $n$ of the n-th groove, coefficients $a$ and $b$, the thickness T (μm) of the light introduction plate 12, and the depth $H_1$ of the first groove with the coefficient $a$ set from $1.0 \times 10^{-8}$ or more to $5.0 \times 10^{-8}$ or less and the coefficient b set from $1.0 \times 10^{-6}$ or more to $3.0 \times 10^{-6}$ or less.

$$H_n = (an^2 + bn) \times T + H_1 \tag{8}$$

When the depths of the grooves 14 are set as shown in the formula (8), they can be more correctly controlled as compared with the case in which they are shown by the above formula (7) shown in of a quadratic function, and thereby the quantities of outgoing light from the light outgoing surface 12b can be made more uniform.

Second Embodiment

In the first embodiment, the quantity of outgoing light from the side end surface 12b is derived from the ratio of the depths of the grooves 14 and the thickness T of the light introduction plate 12, and thereby the depths of the grooves 14 are determined. However, since the light introduction plate 12 is produced by injection molding an acrylic resin or a cycloolefin resin, there is a phenomenon that molding defects occur in a portion of the grooves 14 formed in the stripe shape due to surface sagging, and thus a reflection efficiency lowers in the steep slanting surfaces 14b that constitute the grooves 14.

The molding defects such as surface sagging at the injection molding step occur in an externally projecting portion or in a portion having an inwardly recessed shape on the surface of the light introduction plate 12 in a predetermined length or in a predetermined depth, when molding conditions are given. More specifically, the height of a projecting portion denoted by reference numeral 18 on the opposing surface 12c of the light introduction plate 12 shown in FIG. 3 becomes low by a predetermined amount and the depth of a recessed portion denoted by reference numeral 19 on the opposing surface 12c becomes shallow by a predetermined amount.

Thus, a front light having a light introduction plate the depths of the grooves of which are more correctly controlled by correcting the molding defects such as the surface sagging will be described below in detail as a second embodiment of the present invention with reference to FIG. 4.

Figure 4:
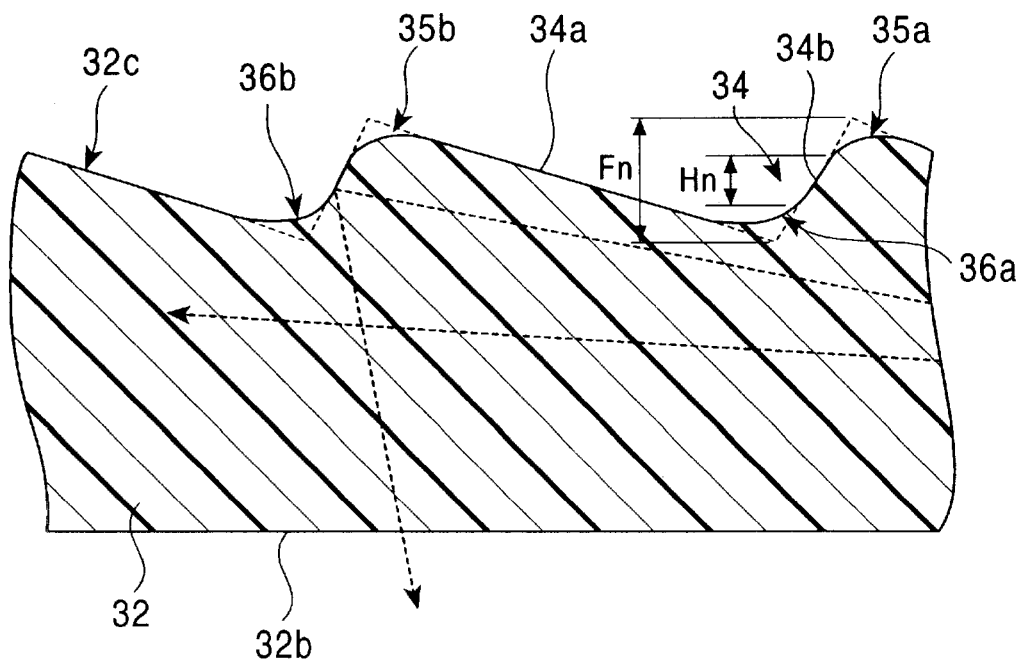
FIG. 4 is a fragmentary sectional view of a light introduction plate of a front light of a second embodiment of the present invention.

FIG. 4 is a fragmentary sectional view of the light introduction plate of the front light as the second embodiment of the present invention. In the figure, the light introduction plate 32 has a light outgoing surface 32b, which is formed as a flat surface and from which light outgoes, and an opposing surface 32c formed so as to be opposed to the light outgoing surface 32b. A plurality of grooves 34 are formed on the opposing surface 32c in a stripe shape. Each of the grooves 34 is composed of a gentle slanting surface 34a, which slants with respect to the light outgoing surface 32b, and a steep slanting surface 34b which is formed continuously to the gentle slanting surface 34a and has a slanting angle steeper than that of the gentle slanting surface 34a.

The grooves 34 are formed deeper as they are located farther from a light source 33. Further, the plurality of grooves 34, which are formed in the stripe shape, are formed such that the difference between respective two adjacent ones of the grooves 34 is made larger in a light introducing direction. Further, although not shown, the structure of the front light of the second embodiment is similar to the front light 10 shown in FIG. 1, that is, the front light includes the light introduction plate 32 shown in FIG. 4 and the light source 33 located on a side end surface of the light introduction plate 32. In FIG. 4, the light source 33 is located on a right side, and the light therefrom travels through the inside of the light source 33 from the right side to a left side. Further, the light, which is reflected by the steep slanting surfaces 34b and travels to the light outgoing surface 32b, of the light traveling through the inside of the light introduction plate 32 outgoes from the light outgoing surface 32b.

It is preferable that the depths of the plurality of grooves 34 of the light introduction plate 32 of the second embodiment be determined such that the depth $F_n$ of a n-th groove from the light source 33 is shown by ($H_n$+d), in which $H_n$ shows an effective portion of the depth $F_n$ that contributes to outgoing of light and $d$ shows an ineffective portion other than the effective portion $H_n$ and that the depth $F_{n+1}$ of a (n+1)-th groove from the light source 33 is shown by the following formula (9) using the depth $F_n$ of the n-th groove, the thickness T of the light introduction plate and the ineffective portion $d$.

$$F_{n+1} = ((F_n - d) \times T/(T - F_n + d)) + d \tag{9}$$

The formulas (9) will be described below in detail.

In the second embodiment, the depths of the plurality of grooves 34 formed in the stripe shape are set in consideration of the molding defects. The depths of the grooves 34 will be described below in detail with reference to FIG. 4. As shown in FIG. 4, projecting portions 35a and 35b and recessed portions 36a and 36b are formed on the opposing surface 32c of the light introduction plate 32 by the grooves 34 formed in the stripe shape.

As shown in FIG. 4, surface sagging arises in the projecting portions 35a and 35b and the recessed portions 36a and 36b at the step where the light introduction plate 32 is produced by injection molding. More specifically, when the projecting portion 35a shown in FIG. 4 is taken as an example, the portion shown by a dotted line in the vicinity of the projecting portion 35a shows a shape formed in an injection molding metal mold for producing the light introduction plate 32. However, the projecting portion 35a, from which a corner is removed, is formed in the actually produced light introduction plate 32 as shown in FIG. 4. This is also applied to the projecting portion 35b and the recessed portions 36a and 36b in the same way.

In the light introduction plate 32 shown in FIG. 4, the outgoing light created by a groove 34 is the light reflected by a steep slanting surface 34b, and a larger quantity of light can be created by a deeper groove. Accordingly, when the groove 34 shown in FIG. 4 is the n-th groove from the light source 33, only the steep slanting surface 34b, which corresponds to the effective portion $H_n$ of the effective groove 34 that is obtained by removing the molding defect from the designed depth $F_n$ of the groove, contributes to outgoing of light, when the molding defect is taken in to consideration. When the depth of the groove from which effective portion $H_n$ is removed is shown by $\underline{d}$, the ineffective portion is shown by $d = F_n - H_n$.

Incidentally, the projecting portions 35a and 35b are offset from the dimensions thereof designed in the metal mold by approximately the same amount. This is also applied to the other projecting portions formed on the opposing surface of the light introduction plate 32 in the same way. Further, the recessed portions 36a and 36b are also offset from the designed dimensions thereof, similarly to the projecting portions 35a and 35b. Thus, the ineffective portion d can be set as a given value regardless of the depths of the grooves 34.

From the mentioned above, the quantities of outgoing light from the light outgoing surface 32b of the light introduction plate 32 can be made uniform by appropriately setting the effective portion $H_n$ in the depths of the plurality of grooves 34. Specifically, it is sufficient to set the effective portions $H_n$ of the grooves 34 such that the depth $H_{n+1}$ of a (n+1)-th groove from the light source 33 satisfies the above formula (1) using the depth $H_n$ of the n-th groove 34 and the thickness T of the light introduction plate 12.

Since the ineffective portion $\underline{d}$ of the depths of the grooves 34 can be set to the given value regardless of the depths of the grooves 34 as described above, the designed depth $F_n$ of the n-th groove is shown by the sum of the effective portion $H_n$ and the ineffective portion $\underline{d}$, and thereby a formula $F_n = H_n + d$ is established. From the above formulas, the designed depths of the respective grooves 34 are set such that the designed depth $F_{n+1}$ of the n-th groove satisfies the following formula (10) using the designed depth $F_n$ of the n-th groove 34, the thickness of the light introduction plate 32, and the ineffective portion $\underline{d}$.

$$F_{n+1} = (F_n - d) \times T / (T - F_n + d) \quad (10)$$

The first and second embodiments have been described as to the light introduction plate applied to the surface light emitting device, the light introduction plate being arranged to have the stripe-shaped grooves formed on one surface thereof with the flat portions disposed therebetween as in the light introduction plate 12 shown in FIG. 1 and the light introduction plate 32 shown in FIG. 4. However, a light introduction plate, which has stripe-shaped grooves formed on one surface thereof with flat portions formed on the bottoms of the grooves may be applied to the surface light emission device of the present invention. A surface light emission device provided with the light introduction plate arranged as described above has large quantities of light outgoing from the light outgoing surface thereof and can cause light to outgo uniformly from the light outgoing surface by setting the depths of the grooves similarly to those of the first and second embodiments.

While the front light, which has the light source disposed only to the one side end surface of the light introduction plate, has been described in the first or second embodiment, the light source may be disposed to both of two opposing side end surfaces. When this arrangement is employed, grooves are made shallower as they are located nearer to both the light sources disposed to the side end surfaces and made deeper as they are located nearer to the center of the light introduction plate. With this arrangement, a surface light emission device can be realized which has a large area and in which quantities of light are uniform on a light outgoing surface.

Method of Manufacturing Surface Light Emission Device

Figure 5A:
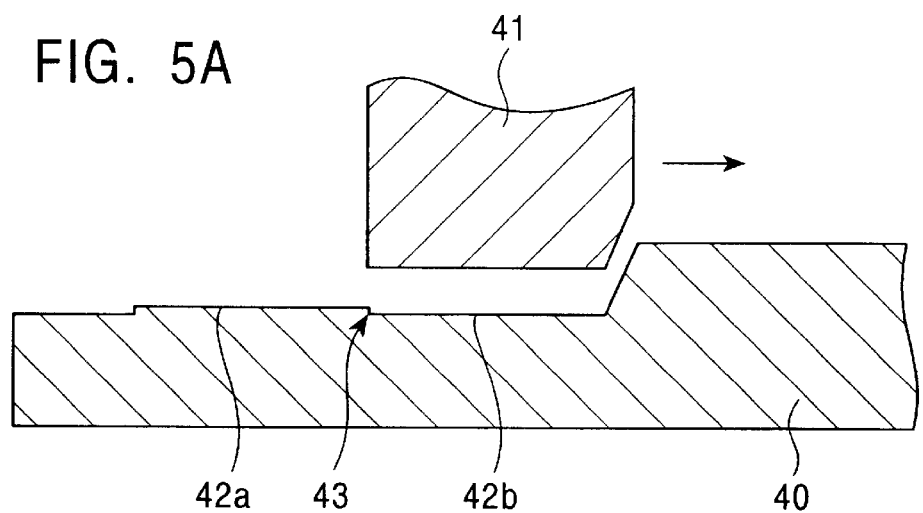
FIGS. 5A to 5C are sectional views showing an example of manufacturing steps for manufacturing the surface light emission device according to the present invention in the sequence of the steps.
Figure 5B:
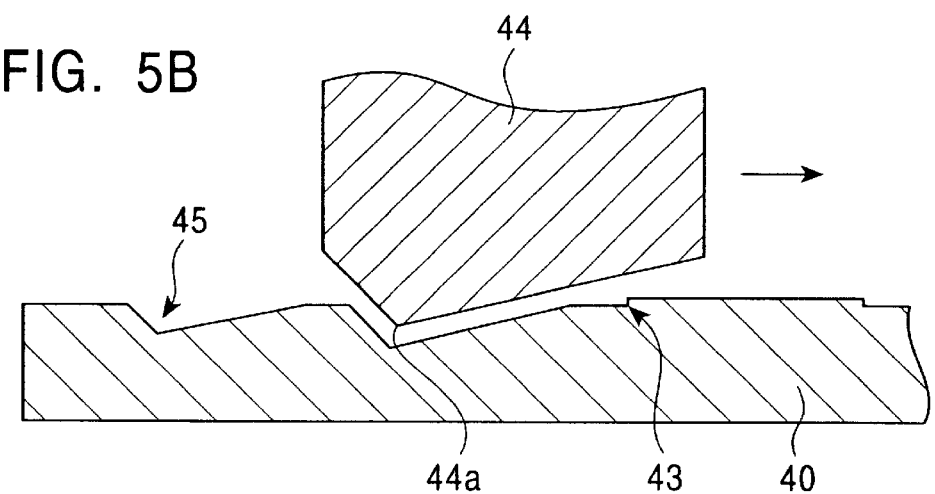
Figure 5C:
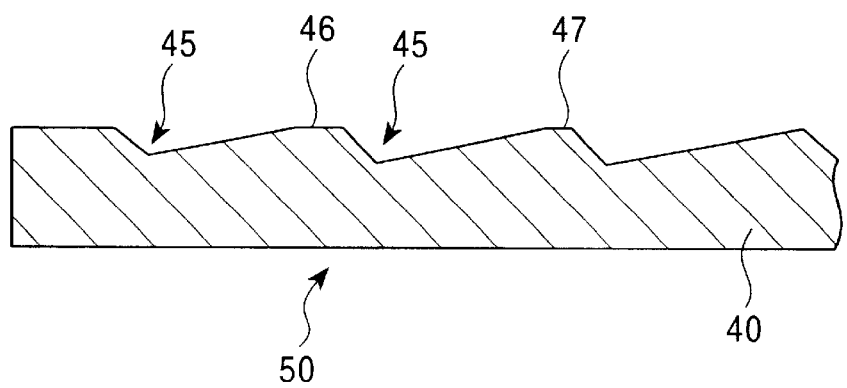
Figure 6D:
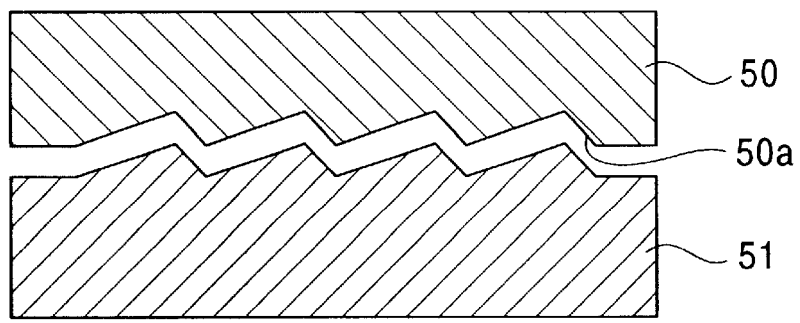
FIGS. 6D to 6F are sectional views showing the example of the manufacturing steps for manufacturing the surface light emission device according to the present invention in the sequence of steps.
Figure 6E:
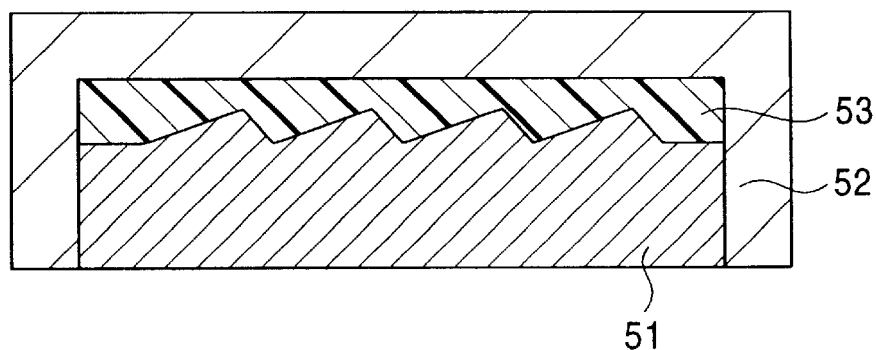
Figure 6F:
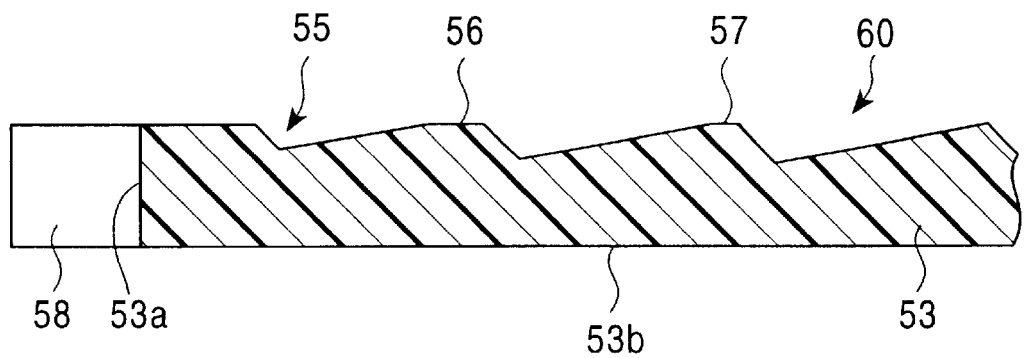

Next, a method of manufacturing a surface light emission device according to the present invention will be described with reference to FIGS. 5 and 6. FIGS. 5 and 6 are sectional structural views showing an example of manufacturing steps for manufacturing the surface light emission device of the present invention. FIGS. 5A to 5C and FIGS. 6D to 6F sequentially show of respective steps, and the step shown in FIG. 5C is continuous to the step shown in FIG. 6D.

First, as shown in FIG. 5A, one surface of a flat casting mold substrate 40, which is composed of a material, for example, SUS 420 steel on which Ni is plated in a thickness of 50–100 μm thick, is machined flatly at a pitch of, for example, 160 μm using a diamond cutter 41 having a flat extreme end. It is very difficult to continuously form flat surfaces as shown in FIG. 5A by the flat machining performed by the diamond cutter 41 that is fed at the pitch. That is, in actual machining, a flat portion 42a is formed by the flat machining as well as a step portion 43 is formed in the boundary between the flat portion 42a and a flat portion 42b formed adjacent to the flat portion 42a.

At the step shown FIG. 5A, the flat machining is performed downward to the casting mold substrate 40 with the diamond cutter 41 with a machining accuracy of about 0.1 μm in the thickness direction of the casting mold substrate 40 being flatly machined. Therefore, the step portion 43 having a height of about 0.3 μm or less is formed in the boundary between the flat portions 42a and 42b. However, the surface roughness (Ra) of the flat portions 42a and 42b, which have been formed by the flat machining, is 0.01 μm or less. Thus, even if the step portion 43 formed in the boundary between the flat portions 42a and 42b has a height of only one-several tens of microns by the difference therebetween, the step portion 43 is recognized as a step, from which a problem of scattering of light arises.

Next, different from the above step, a machining position is determined using a diamond cutter 44 having a triangular extreme end such that the extreme end 44a of the diamond cutter 44 is positioned at the step portion 43 formed by the flat machining, and a groove 45 is continuously formed thereby in a stripe shape along the step portion 43.

With this machining, a casting mold 50 is obtained as shown in FIG. 5C. With the above steps, the flat surfaces having a desired surface roughness can be formed on the casting mold substrate 40 as well as the step portion 43, which can be recognized, can be formed by performing the flat machining to the one surface of the casting mold substrate 40 by the diamond cutter 41 that is fed at the pitch. At a subsequent step for forming the grooves 45, it is possible to accurately position the diamond cutter 44 to the step portion 43 so as to machine the same. On the other hand, the step portion 43, which causes an optical problem, can be removed by the machining performed by the diamond cutter 44. Therefore, according to the manufacturing method of the present invention, the dimensional accuracy of the grooves of a light introduction plate to be produced can be improved, and thereby the quantities of outgoing light from the surface light emission device and the distribution of the quantities thereof can be made as near as possible to designed values.

The grooves 45 formed at the step shown in FIG. 5B are gradually made deeper sequentially from a groove 45 machined first as the grooves are fed each pitch. Further, an amount of increase of the depth of the grooves 45 is made gradually larger at each pitch in the sequence in which the grooves 45 are pitch fed. Specifically, the grooves 45 are formed in a stripe shape such that when the groove which is formed first is shown as a first groove, the depth $F_{n+1}$ of a (n+1)-th groove satisfies the above formula (10) using the depth $F_n$ of a n-th groove, an effective portion $H_n$ of the depth $F_n$ which contributes to the outgoing of light from a light outgoing surface, and the ineffective portion $d$ other than the effective portion $H_n$.

A surface light emission device, which has uniform quantities of light from the light outgoing surface of a light introduction plate, can be arranged by setting the depths of the grooves 45 so that they satisfy the formula (10). The reason of it is as described in the second embodiment.

Otherwise, the grooves 45 may be formed such that the depth $H_n$ ($\mu$m) of a n-th groove 45 from the groove formed first satisfies the above formula (7) using the number $n$ of the groove, a coefficient a from $1.0\times10^{-8}$ or more to $5.0\times10^{-8}$ or less, the thickness T ($\mu$m) of the light introduction plate to be produced, and the depth $H_1$ ($\mu$m) of the first groove. The light introduction plate produced using the casting mold is also arranged such that grooves are made deeper as they are located farther from the light source as well as the difference between the depths of adjacent grooves is made larger as they are located farther from light source similarly to the above light introduction plate. Thus, a surface light emission device, which has uniform quantities of light from the light outgoing surface of the light introduction plate, can be arranged.

Otherwise, the grooves 45 may be formed such that the depth $H_n$ ($\mu$m) of the n-th groove 45 from the groove formed first satisfies the following formula (11) using the number $n$ of the groove, the coefficient $a$ from $1.0\times10^{-8}$ or more to $5.0\times10^{-8}$ or less, a coefficient $b$ from $1.0\times10^{-5}$ or more to $3.0\times10^{-6}$ or less, the thickness T ($\mu$m) of the light introduction plate to be produced, and the depth $H_1$ ($\mu$m) of the first groove.

$$F_n=(an^2+bn)\times T+H_1 \tag{11}$$

When the light introduction plate produced in the above arrangement is used, a surface light emission device, which has uniform quantities of light from the light outgoing surface of the light introduction plate, can be also arranged.

Further, when the depths of the grooves are determined using any of the formulas, it is preferable to form flat portions 46 and 47 between adjacent grooves 45 as shown in FIG. 5C. The formation of the flat portions 46 and 47 between the adjacent grooves can prevent such a phenomenon that light strongly reflects by the surface of the light introduction plate of the thus manufactured surface light emission device and a visual property lowers.

Further, it is preferable that the flat portions 46 and 47 be formed such that the areas thereof are gradually made smaller in the pitch feed direction of the diamond cutter 44. That is, in FIG. 5C, it is preferable that the area of the flat portion 47 be formed smaller than that of the flat portion 46 that is located in the pitch feed direction. With this arrangement, the reflection of light in a particular direction can be effectively prevented.

Next, as shown in FIG. 6D, an injection molding metal mold 51 composed of Ni, etc. is produced by a Ni electrocasting using the casting mold 50 produced at the above step. The metal mold 51 includes an uneven surface the shape of which is opposite to that formed on the one surface 50a of the casting mold 50 on which the grooves 45 are formed.

Next, as shown in FIG. 6E, an acrylic resin or a cycloolefin resin is injection molded using the metal mold 51 having the uneven shape opposite to that of the casting mold 50 and a box-shaped metal mold 52, and thereby a light introduction plate 53 having the same surface shape as that on the one surface 50a of the casting mold 50 is produced. As shown in FIG. 6F, grooves 55 are formed on one surface of the light introduction plate 53 in a stripe shape such that they are made gradually deeper from the side end surface 53a of the light introduction plate 53 toward the opposing side end surface thereof. Further, flat portions 56 and 57 are formed between respective adjacent ones of the grooves 55, and the areas of the flat portions are made smaller in a direction where the flat portions are located farther from the side end surface 53a of the light introduction plate 53. That is, in the light introduction plate 53 shown in FIG. 6F, the area of the flat portion 57 is made smaller than that of the flat portion 56 located on the side end surface 53a side.

Next, as shown in FIG. 6F, a rod-like light source 58 composed of a cold-cathode tube or a LED is disposed to the side end surface 53a of the light introduction plate 53, and thereby a surface light emission device 60 is obtained.

The surface light emission device 60 manufactured by the above steps comprises the light introduction plate 53 and the light source 58 disposed to the side end surface 53a thereof. Then, the surface light emitting device 60 introduces the light from the light source 58 into the inside of the light introduction plate 53 through the side end surface 53a of the light introduction plate 53; changes the direction of the light traveling in the inside of the light introduction plate 53 by the grooves 55 formed in the stripe shape; causes the light to outgo from a light outgoing surface 53b opposite to the surface on which the grooves 55 are formed.

In the surface light emission device 60 manufactured by the manufacturing method of the second embodiment, the grooves 55 formed on the one surface of the light introduction plate 53 are formed deeper as they are located at positions farther from the light source 58, and the difference between the depths of respective two adjacent grooves 55 is made larger as they are located farther from the light source 58. Thus, it is possible to make the quantities of light outgoing from the light outgoing surface 53b uniform thereon. Further, since the depths of the grooves 55 are designed previously taking the molding defects such as surface sagging, which are caused in the injection molding step shown in FIG. 6E, into consideration, the distribution of the quantities of outgoing light can be made uniform without reducing the quantities of the outgoing light from the light outgoing surface 53b.

Otherwise, a method of producing a metal mold by applying flat machining and groove machining to a metal mold substrate without using the above metal mold produced from the casting mold can be also employed as a manufacturing method of the surface light emission device of the present invention. That is, in the second embodiment, the casting mold 50 shown in FIG. 5C can be used as an injection molding metal mold as it is. This manufacturing method will be described below in detail with reference to FIGS. 7 and 8 as another embodiment of the method of manufacturing the surface light emitting device of the present invention.

Figure 7A:
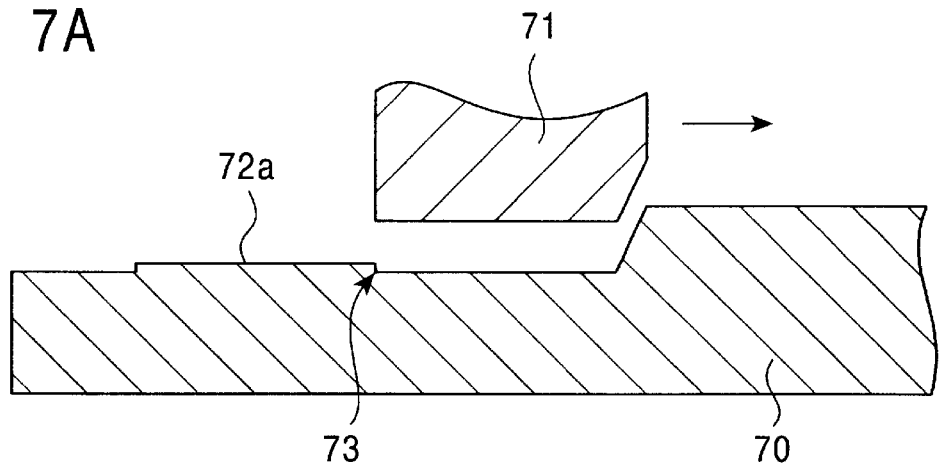
FIGS. 7A to 7C are sectional views showing the example of the manufacturing steps for manufacturing the surface light emission device according to the present invention in the sequence of the steps.
Figure 7B:
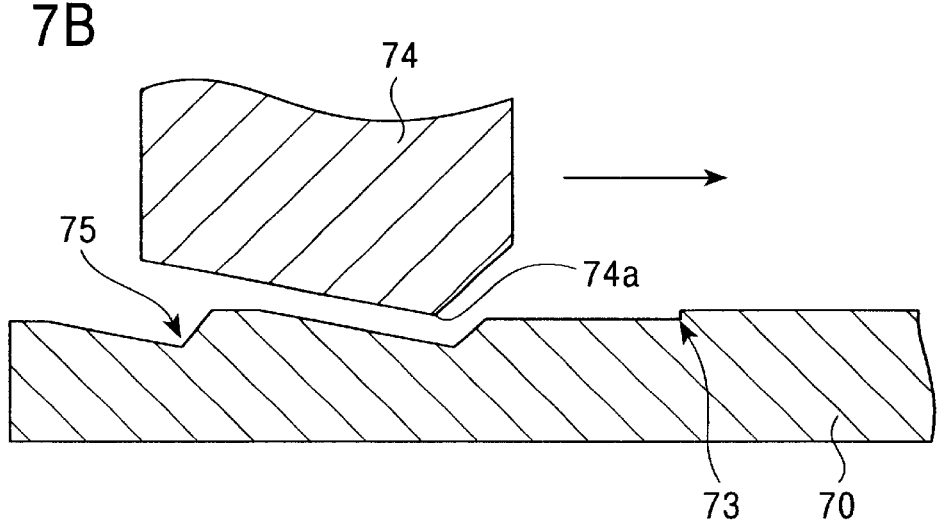
Figure 7C:
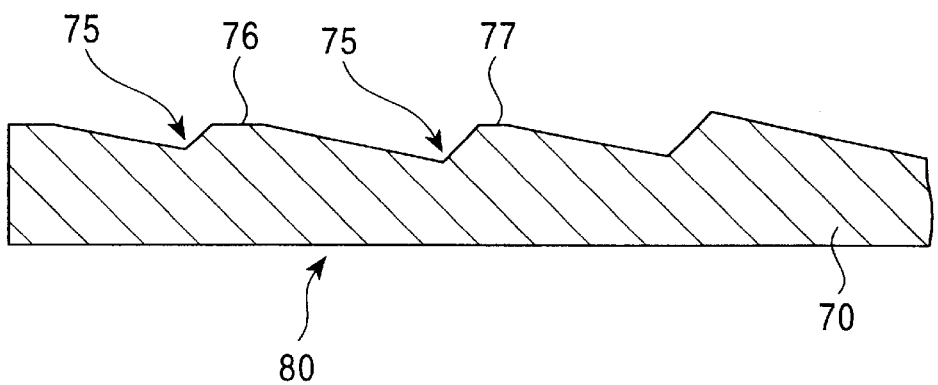

FIGS. 7A to 7C and FIGS. 8D and 8E are sectional structural view showing an example of manufacturing steps of the surface light emission device of the second embodiment. The step shown in FIG. 7C is continuous to the step shown in FIG. 8D.

First, as shown in FIG. 7A, one surface of a flat metal mold substrate 70, which is composed of a material, for example, SUS 420 steel on which Ni is plated in a thickness of 50–100 μm thick, is machined flatly at a pitch of, for example, 160 μm using a diamond cutter 71 having a flat extreme end. In the machining, a step portion 73, which is similar to that formed in the manufacturing steps shown in FIGS. 5 and 6, is formed in the boundary of a flat portion 72a formed by the flat machining also in the manufacturing step of the embodiment.

Next, as shown in FIG. 7B, a machining position is determined using a diamond cutter 74 having a triangular extreme end such that the extreme end 74a of the diamond cutter 74 is positioned at the step portion 73 formed by the flat machining, and a groove 75 is continuously formed thereby in a stripe shape along the step portion 43. Thus, a metal mold 80 is obtained.

Note that, in the manufacturing method of this embodiment, the machining is performed at the step shown in FIG. 7B such that the positional relationship between the gentle slanting surface and the steep slanting surface of the groove 75, which is formed by the diamond cutter 74, is made opposite to that of the groove 45 shown in FIG. 5B. That is, in the machining, the direction of the diamond cutter 74 is set such that the steep slanting surface of the groove 75 is located on a first groove 75 side. This is because that since the metal mold is produced without using a casting mold in the manufacturing method of this embodiment, the uneven shape formed on the surface of a light introduction plate to be produced is opposite to the uneven shape machined by the diamond cutter 74.

Further, the depths and the pitches of the grooves 75 formed at the step shown in FIG. 7B are similar to those of the grooves 45 shown in FIG. 5. That is, the grooves 75 are gradually made deeper sequentially from the groove 75 machined first as the grooves are fed each pitch. Further, an amount of increase of the depth of the grooves 45 is made gradually larger at each pitch in the sequence in which the grooves 45 are pitch fed. Further, the formulas used in the previous embodiments can be also used as the formulas as to the grooves 75.

Figure 8D:
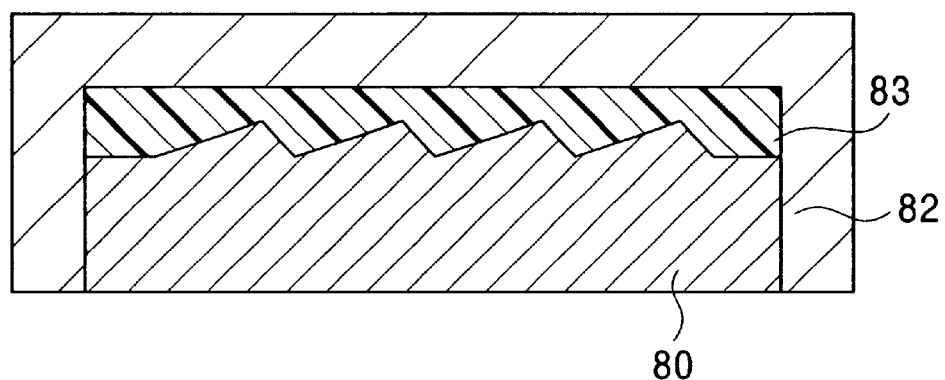
FIGS. 8D and 8E are sectional views showing the example of the manufacturing steps for manufacturing the surface light emission device according to the present invention in the sequence of steps.

Next, as shown in FIG. 8D, an acrylic resin or a cycloolefin resin is injection molded using the metal mold 80 produced at the above step and a box-shaped metal mold 82, and thereby a light introduction plate 83, which has an uneven surface shape opposite to that on the one surface 80a of the metal mold 80, is produced.

Figure 8E:
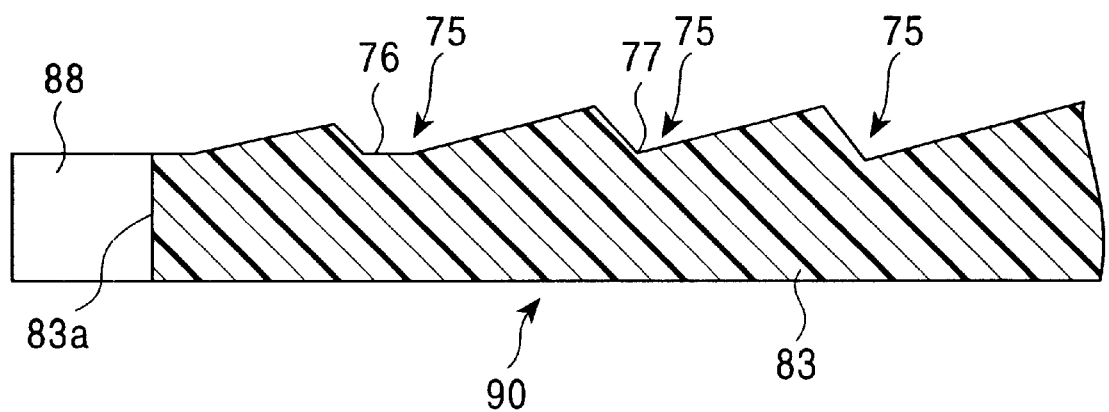

The grooves 75 are formed on one surface of the light introduction plate 83 in a stripe shape as shown in FIG. 8E such that they are made gradually deeper from the side end surface 83a of the light introduction plate 83 toward the opposing side end surface thereof. Further, flat portions 76 and 77 are formed on the bottoms of the grooves 75 such that the areas thereof are made smaller as they are located farther from the side end surface 83a of the light introduction plate 83. That is, in the light introduction plate 83 show in FIG. 8E, the area of the flat portion 77 is made smaller than that of the flat portion 76 located on the side end surface 83a side.

Next, as shown in FIG. 8E, a rod-like light source 88 composed of a cold-cathode tube or a LED is disposed to the side end surface 83a of the light introduction plate 83, and thereby a surface light emission device 90 is obtained. The surface light emission device 90 also can introduce the light from the light source 88 into the inside of the light introduction plate 83 through the side end surface 83a of the light introduction plate 83; can change the direction of the light traveling through the inside of the light introduction plate 83 by the grooves 85 formed in the stripe shape; and can cause the light to outgo from a light outgoing surface 83b opposite to the surface on which the grooves 85 are formed. Further, since the grooves 75 are formed by being controlled similarly to the grooves 55 shown in FIG. 6F, the distribution of uniform quantities of outgoing light can be obtained similar to the surface light emission device 60.

According to the manufacturing method of the surface light emission device arranged as described above, a step at which a casting mold is produced can be omitted because the injection molding metal mold is produced by directly machining it. Accordingly, a manufacturing cost can be reduced by reducing man-hours. Further, since the metal mold is produced without using the casting mold, the dimensional accuracy of the metal mold can be increased, and thereby the light introduction plate and the surface light emission device can be manufactured more accurately.

EXAMPLES

Example 1

First, a casting mold substrate composed of stainless steel was prepared and machined with a diamond cutter having a flat extreme end at a pitch of 160 μm so that one surface of the casting mold substrate was machined flatly. Subsequently, the extreme end of a diamond cutter having a triangular extreme end was positioned at each of step portions, which were formed on the one surface of the casting mold substrate at the pitch of 160 μm by the flat machining, and machining was performed by the diamond cutter along each of the step portions, and thereby a casting mold was obtained by forming grooves in a stripe shape on the one surface of the casting mold substrate. Note that, at the step, the depth of a groove nearest to a light source was set to 5.24 μm in a state in which a surface light emitting device was operated and an amount of correction d (μm) to molding defects was set to d=3.69. Thereafter, the depths of the grooves were sequentially set such that the depth $F_{n+1}$ of a (n+1)-th groove from the light source satisfies the following formula (12) using the depth $F_n$ of a n-th groove and the thickness T of a light introduction plate.

$$F_{n+1}=((F_n-d)\times T/(T-F_n+d)) \tag{12}$$

Specifically, the depths of the grooves were sequentially calculated using the formula (12) with the depth of the first groove set to 5.24 μm and the thickness of the light introduction plate set to 800 μm. The depth of a 314-th groove which was located farthest from the light source was 7.64 μm. The slanting angles of the two slanting surfaces, that is, the steep slanting surface and the gentle slanting surface, which constituted each groove, were set to 45° and 2.87°.

Next, a meal mold composed of Ni was produced using the above casting mold. The metal mold had an uneven shape formed on one surface thereof which was opposite to that of the casting mold.

Subsequently, an acrylic resin was injection molded using the metal mold, and a light introduction plate of 40 mm (lengthwise)×50 mm (crosswise)×0.8 mm (thick) was produced. Then, a rod-like light source having a white LED was disposed to a side end surface, which was parallel to grooves, of the light introduction plate, and thereby a front light was produced.

Figure 9A:
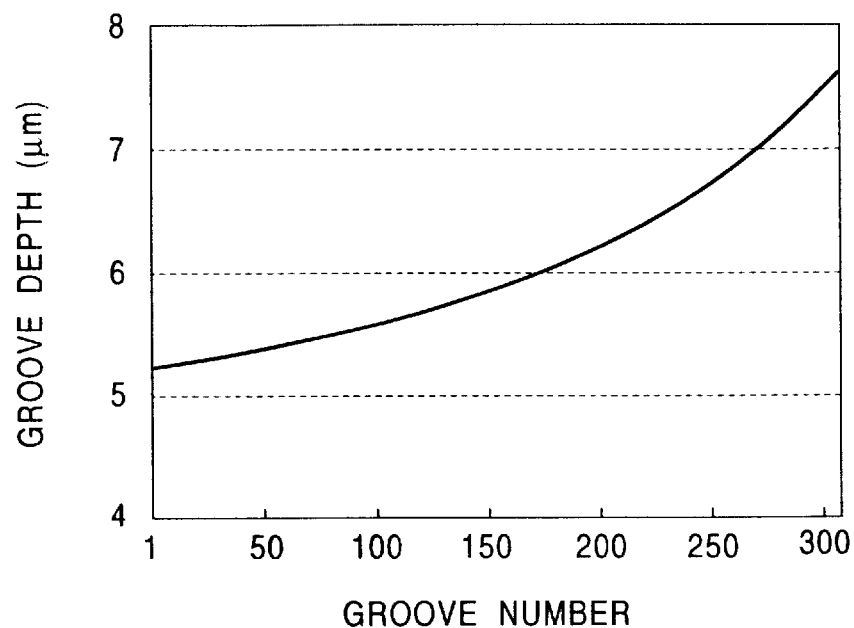
FIG. 9A is a graph showing the distribution of the depths of the grooves of a front light of an example 1 of the present invention.

FIG. 9A is a graph showing the distribution of the depths of the grooves formed on one surface of the light introduction plate of the front light of the example which was obtained by the above steps. In FIG. 9A, the lateral axis shows the numbers of the grooves with a groove nearest to the light source numbered as a first groove, and the vertical axis shows the depths of the grooves in correspondence to the number thereof. As shown in the graph, in the light introduction plate of the example 1, the grooves are formed such that a groove located farther from the light source has a deeper depth and that the difference between the depths of adjacent grooves is made larger as they are located farther from the light source.

Figure 9B:
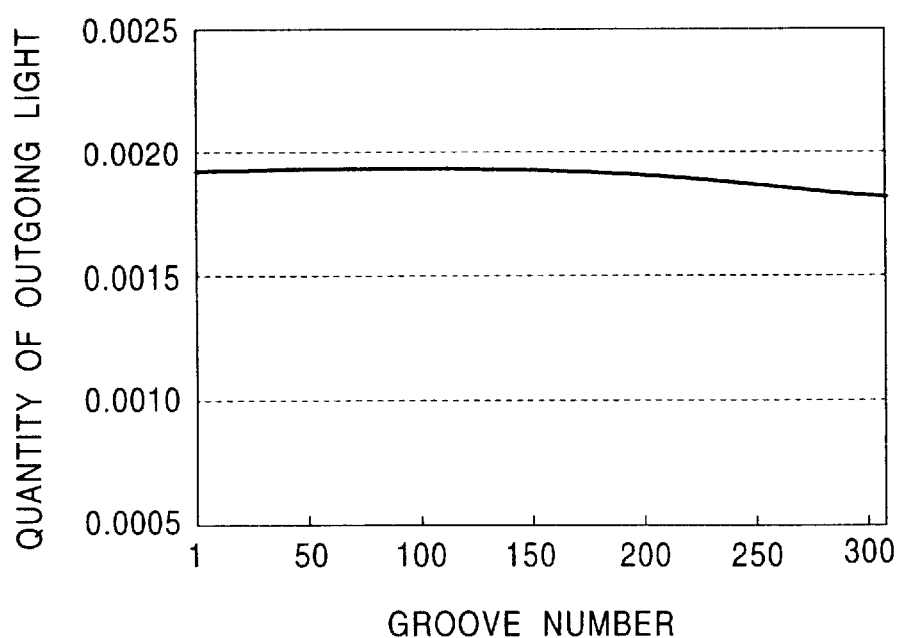
FIG. 9B is a graph showing the distribution of the quantities of outgoing light of the front light of the example 1.

Next, the distribution of the quantities of outgoing light at the respective positions on the light outgoing surface of the light introduction plate was measured by turning on the front light of the example 1. FIG. 9B is a graph showing the result of measurement. In FIG. 9B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 9B, when the quantity of incident light is shown by 1, the maximum value of the quantities of outgoing light from the front light of the example 1 is 0.00194, and the minimum value thereof is 0.001844. Further, the quantities of outgoing light are maximized at the first groove and minimized at a 314-th groove. The distribution of the quantities of outgoing light from the front light of the example 1 is about 95%, when it is shown by the ratio of the minimum value and the maximum value of the quantity of the outgoing light. The average quantity of outgoing light is 0.001899. Further, the light source of the front light of the example 1 was used at an efficiency of 26.0%.

Example 2

Next, a light introduction plate having grooves formed in a stripe shape was produced in a manner similar to that of the example 1 such that the depth of a first groove was set to 5.25 μm and the depth $H_n$ of a n-th groove satisfied the following formula (13) using the number n of the groove and the thickness of the light introduction plate set to 800 μm.

$$H_2=(2.8\times10^{-8})n^2+5.25 \tag{13}$$

Note that the pitch of the respective grooves was set to 160 μm also in the example 2, and the slanting angles of the steep and gentle slanting surfaces which constituted each groove were set to 45° and 2.8°, respectively. Further, the depth of a terminal end (314-th) groove was 7.46 μm.

Next, a light source similar to that of the example 1 was joined to and integrated with the light introduction plate, and thereby a front light was produced.

Figure 10A:
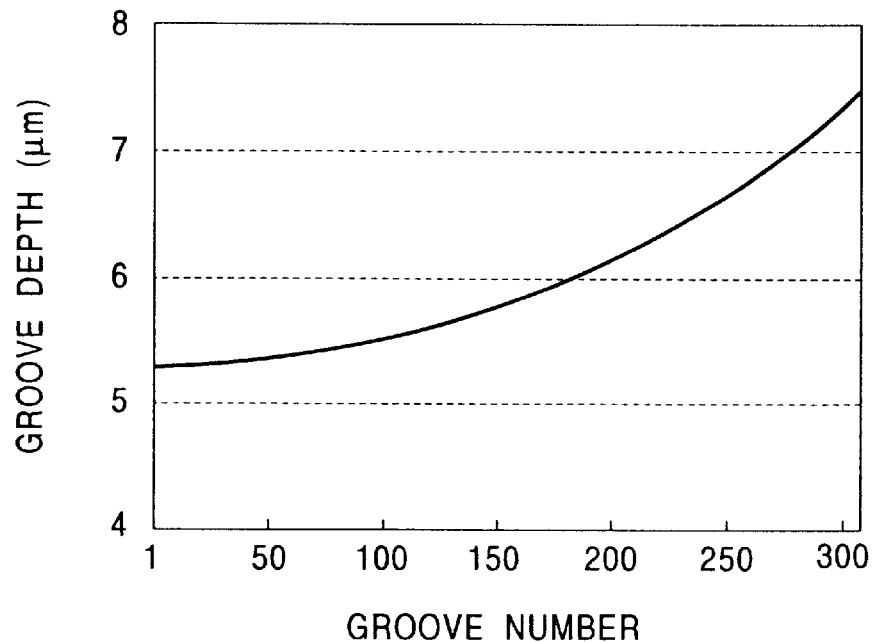
FIG. 10A is a graph showing the distribution of the depths of the grooves of a front light of an example 2 of the present invention.

FIG. 10A is a graph showing the distribution of the depths of the grooves formed on one surface of the light introduction plate of the front light of the example 2 which was obtained at the above steps. In FIG. 10A, the lateral axis shows the numbers of the grooves with a groove nearest to the light source numbered as a first groove, and the vertical axis shows the depths of the grooves in correspondence to the number thereof. As shown in the graph, the grooves of the light introduction plate of the example 2 are formed such that a groove located father from the light source has a deeper depth and that the difference between the depths of adjacent grooves is made larger as they are located farther from the light source.

Figure 10B:
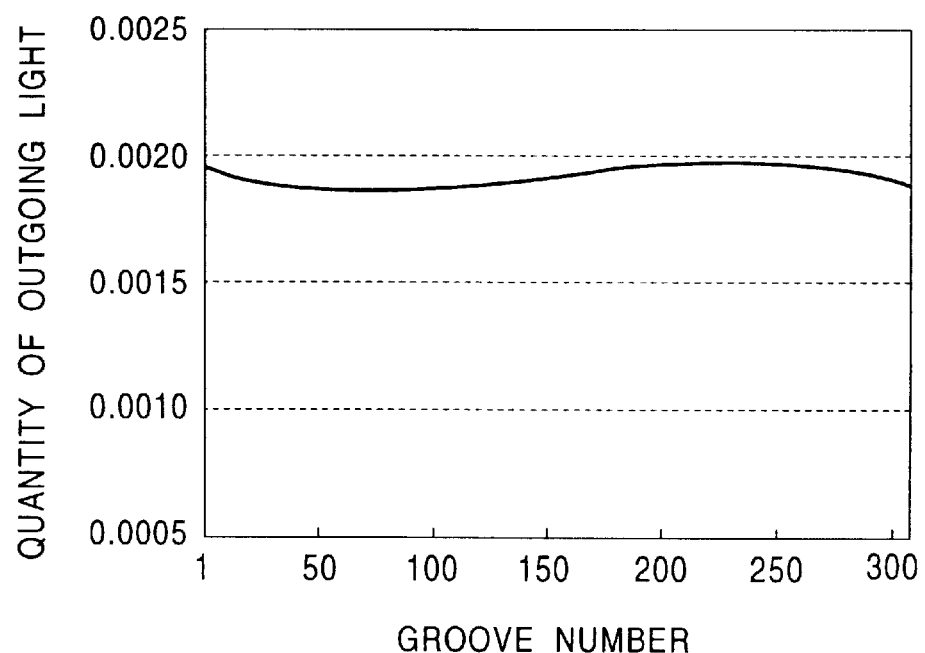
FIG. 10B is a graph showing the distribution of the quantities of outgoing light of the front light of the example 2.

Next, the distribution of the quantities of outgoing light at the respective positions on the light outgoing surface of the light introduction plate was measured by turning on the front light of the example 2. FIG. 10B is a graph showing the result of measurement. In the graph of FIG. 10B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 10B, when the quantity of incident light is shown by 1, the maximum value of the quantities of outgoing light from the front light of the example 2 is 0.001965, and the minimum value thereof is 0.001813. Accordingly, the distribution of the quantities of outgoing light is 92.3%, and the average quantity of outgoing light is 0.001892. Further, the light source of the front light of the example 2 was used at an efficiency of 25.4%.

The quantities of outgoing light of the front light of the example 2 are maximized and minimized at positions different from those of the example 1. That is, they are maximized in the vicinity of a 260-th groove and minimized in the vicinity of a 80-th groove.

Example 3

Next, a light introduction plate having grooves formed in a stripe shape was produced in a manner similar to that of the example 1 such that the depth of a first groove was set to 5.25 μm and the depth $H_n$ (μm) of a n-th groove satisfied the following formula (14) using the number n of the n-the groove.

$$H_n=((2.36\times10^{-8})n^2+(1.6\times10^{-6})n)\times800+5.25 \tag{14}$$

Note that the pitch of the respective grooves was set to 160 μm also in the example 3, and the slanting angles of the steep and gentle slanting surfaces which constituted each groove were set to 45° and 2.82°, respectively. Further, the depth of a terminal end (314-th) groove was 7.51 μm.

Next, a light source similar to that of the example 1 was joined to and integrated with the light introduction plate, and thereby a front light was produced.

Figure 11A:
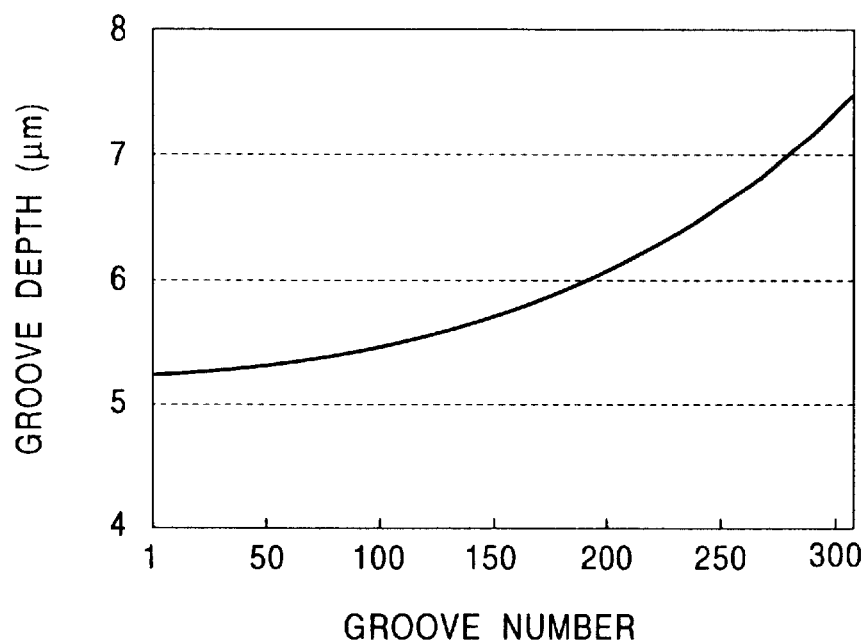
FIG. 11A is a graph showing the distribution of the depths of the grooves of a front light of an example 3 of the present invention.

FIG. 11A is a graph showing the distribution of the depths of the grooves formed on one surface of the light introduction plate of the front light of the example 3 which was obtained by the above steps. In FIG. 11A, the lateral axis shows the numbers of the grooves with a groove nearest to the light source numbered as a first groove, and the vertical axis shows the depths of the grooves in correspondence to the number thereof. As shown in the graph, in the light introduction plate of the example 3, the grooves are formed deeper as they are located farther from the light source, and the difference between the depths of adjacent grooves is made larger as they are located farther from the light source.

Figure 11B:
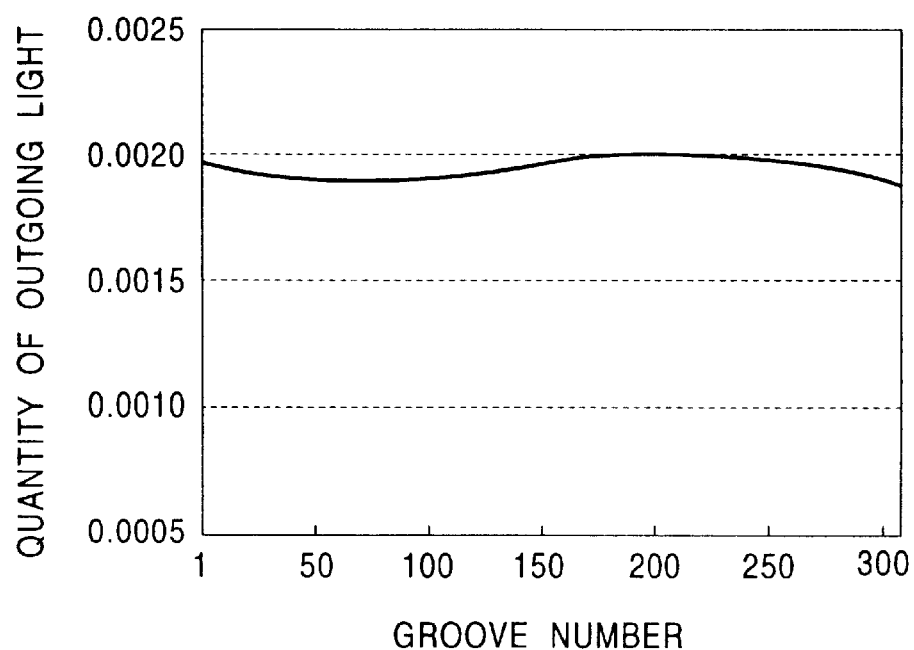
FIG. 11B is a graph showing the distribution of the quantities of outgoing light of the front light of the example 3.

Next, the distribution of the quantities of outgoing light at the respective positions on the light outgoing surface of the light introduction plate was measured by turning on the front light of the example 3. FIG. 11B is a graph showing the result of measurement. In FIG. 11B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 11B, when the quantity of incident light is shown by 1, the maximum value of the quantities of outgoing light of the front light of the example 3 is 0.001984, and the minimum value thereof is 0.001879. Accordingly, the distribution of the quantities of outgoing light is 94.7%, and the average quantity of outgoing light is 0.001934. Further, the light source of the front light of the example 3 was used at an efficiency of 25.9%.

The quantities of outgoing light of the front light of the example 3 are maximized and minimized at positions different from those of the examples 1 and 2. That is, they are maximized in the vicinity of a 230-th groove and minimized in the vicinity of a 60-th groove.

Comparative Example 1

Next, a light introduction plate on which grooves were formed in a stripe shape was produced by setting the depth of a first groove to 5.06 μm and making the depth of each groove deeper by 0.0056 μm. Note that the pitch of the respective grooves was set to 160 μm also in the comparative example 1, and the slanting angles of the steep and gentle slanting surfaces which constituted each groove were set to 45° and 2.55°, respectively. Further, the depth of a terminal end (314-th) groove was 6.82 μm.

Next, a light source similar to that of the example 1 was joined to and integrated with the light introduction plate, and thereby a front light was produced.

Figure 12A:
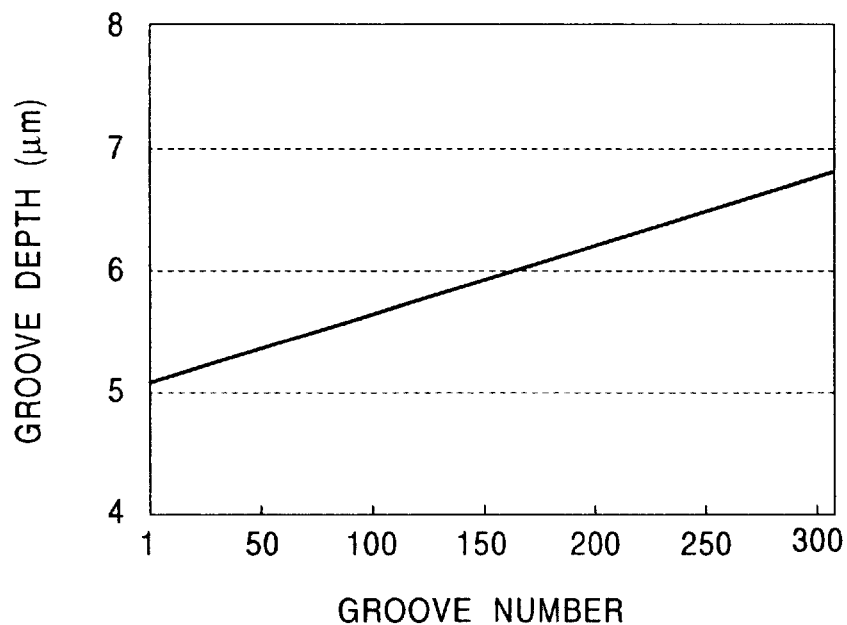
FIG. 12A is a graph showing the distribution of the depths of the grooves of a front light of a comparative example 1.

FIG. 12A is a graph showing the distribution of the depths of the grooves formed on one surface of the light introduction plate of the front light of the comparative example 1 which was obtained by the above steps. In FIG. 12A, the lateral axis shows the numbers of the grooves with a groove nearest to the light source numbered as a first groove, and the vertical axis shows the depths of the grooves in correspondence to the number thereof. As shown in FIG. 12A, in the light introduction plate of the comparative example 1, while the grooves are formed deeper as they are located farther from the light source, the difference between the depths of adjacent grooves is set to a given value of 0.0056 μm regardless of the distance thereof from the light source.

Figure 12B:
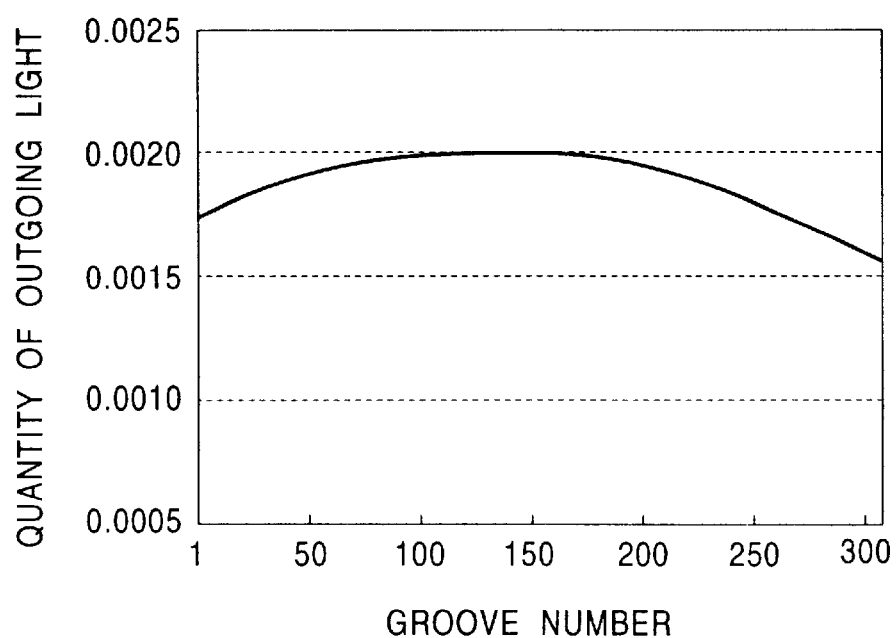
FIG. 12B is a graph showing the distribution of the quantities of outgoing light of the front light of the comparative example 1.

Next, the distribution of the quantities of outgoing light at the respective positions on the light outgoing surface of the light introduction plate was measured by turning on the front light of the comparative example 1. FIG. 12B is a graph showing the result of measurement. In FIG. 12B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 12B, when the quantity of incident light is shown by 1, the maximum value of the quantities of outgoing light of the front light of the comparative example 1 is 0.001981, and the minimum value thereof is 0.001620. Accordingly, the distribution of the quantities of outgoing light is 81.8%, and the average quantity of outgoing light is 0.001870. Further, the light source of the front light of the comparative example 1 was used at an efficiency of 25.1%.

The quantities of outgoing light of the front light of the example 3 are maximized and minimized at positions different from those of the examples 1 to 3. That is, they are maximized in the vicinity of a 120-th groove and minimized in the vicinity of a 314-th groove.

Comparative Example 2

Next, a light introduction plate having a conventional arrangement was produced, and a front light was produced using it. The light introduction plate having the conventional arrangement was such that grooves were continuously and periodically formed in a stripe shape on the opposing surface of the light introduction plate which was opposed to the light outgoing surface thereof from which light outgoes. Each of the grooves was composed of a gentle slanting surface, which slanted with respect to the light outgoing surface, and a steep slanting surface which had a slanting angle steeper than that of the gentle slanting surface, and all of these grooves were formed in the same shape.

The light introduction plate, on which the grooves were formed in the stripe shape, was produced such that the depth of the grooves was set to 5.66 μm, and the slanting angles of the steep and gentle slanting surfaces which constituted each groove were set to 45° and 2.1°, respectively. Then, a rod-like light source having a white LED was joined to and integrated with the light introduction plate, and thereby a front light was produced.

Figure 13A:
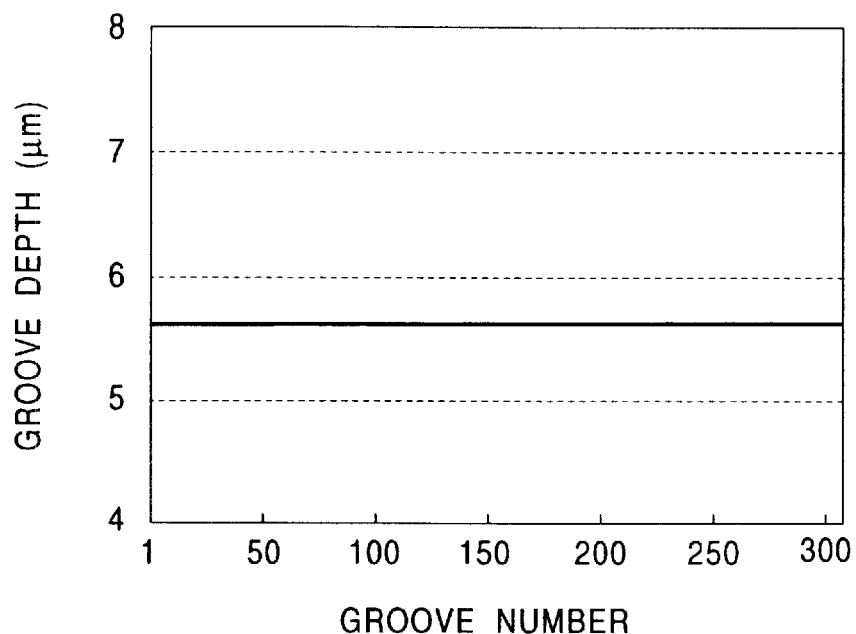
FIG. 13A is a graph showing the distribution of the depths of the grooves of a front light of a comparative example 2.

FIG. 13A is a graph showing the distribution of the depths of the grooves formed on one surface of the light introduction plate of the front light of the comparative example 2. In the graph of FIG. 13A, the lateral axis shows the numbers of the grooves with a groove nearest to the light source numbered as a first groove, and the vertical axis shows the depths of the grooves in correspondence to the number thereof. As shown in FIG. 13A, the depth of the grooves of the comparative example 2 was set to the given value of 5.66 μm regardless of the distances thereof from the light source.

Figure 13B:
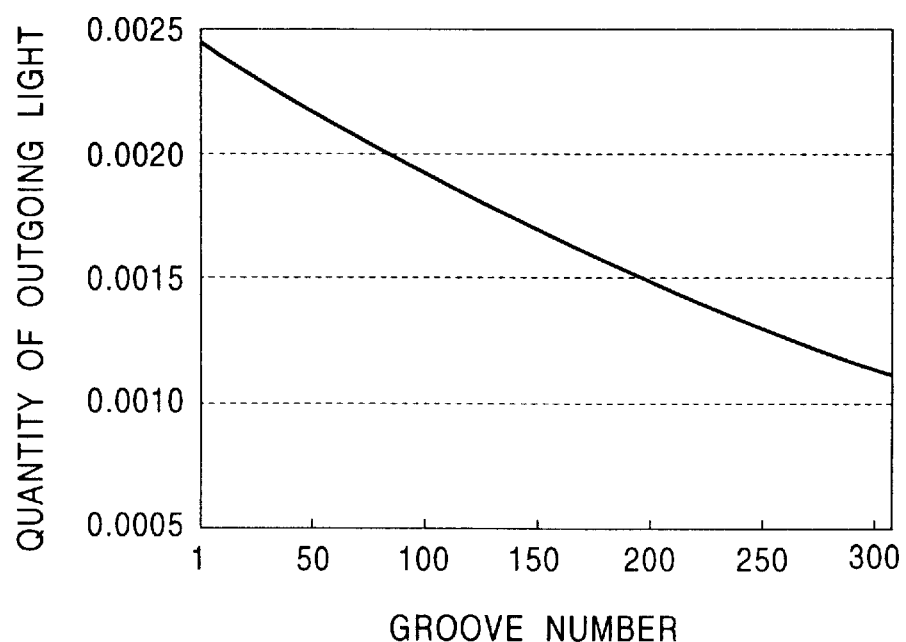
FIG. 13B is a graph showing the distribution of the quantities of outgoing light of the front light of the comparative example 2.

Next, the distribution of the quantities of outgoing light at the respective positions on the light outgoing surface of the light introduction plate was measured by turning on the front light of the comparative example 2. FIG. 13B is a graph showing the result of measurement. In the graph of FIG. 13B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 13B, when the quantity of incident light is shown by 1, the maximum value of the quantities of outgoing light from the front light of the comparative example 2 is 0.002464, and the minimum value thereof is 0.001138. Accordingly, the distribution of the quantities of outgoing light is 46.2% and the average quantity of outgoing light is 0.001717. Further, the light source of the front light of the comparative example 2 was used at an efficiency of 23.0%.

The quantities of outgoing light from the front light of the comparative example 2 was maximized at the first groove and minimized at a 314-th groove.

Comparative Example 3

Next, a front light was manufactured as a comparative example 3. It was similar to that of the comparative example 2 except that the depth of grooves was set to 4.49 μm and that the slanting angle of gentle slanting surfaces was set to 1.65°.

Figure 14A:
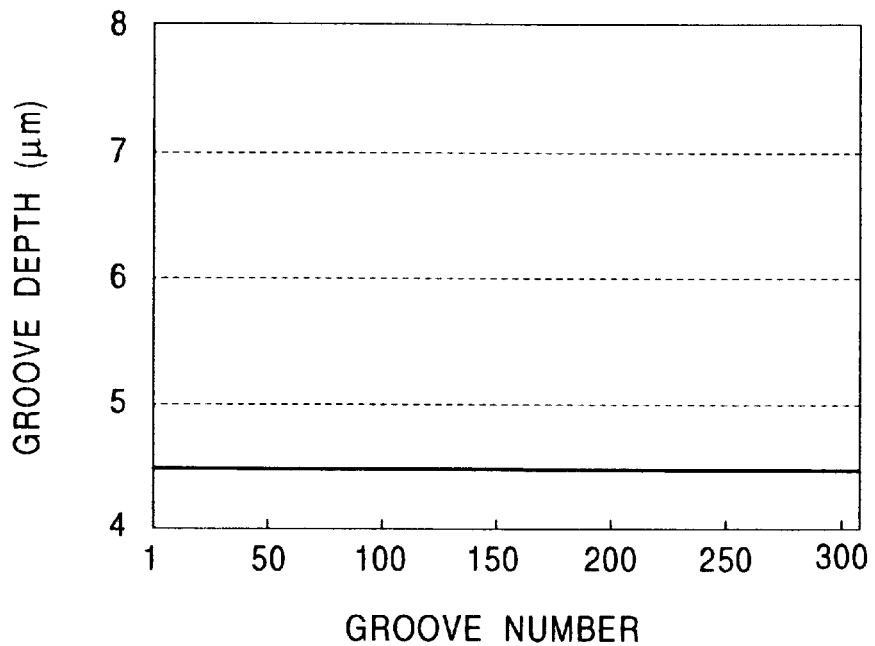
FIG. 14A is a graph showing the distribution of the depths of the grooves of a front light of a comparative example 3.

FIG. 14A is a graph showing the distribution of the depths of the grooves formed on one surface of the light introduction plate of a front light of the comparative example 3. In the graph of FIG. 14A, the lateral axis shows the numbers of the grooves with a groove nearest to a light source numbered as a first groove, and the vertical axis shows the depths of the grooves in correspondence to the number thereof. As shown in the figure, the depth of the grooves of the comparative example 3 has a given value of 4.49 μm regardless of the distance thereof from the light source.

Figure 14B:
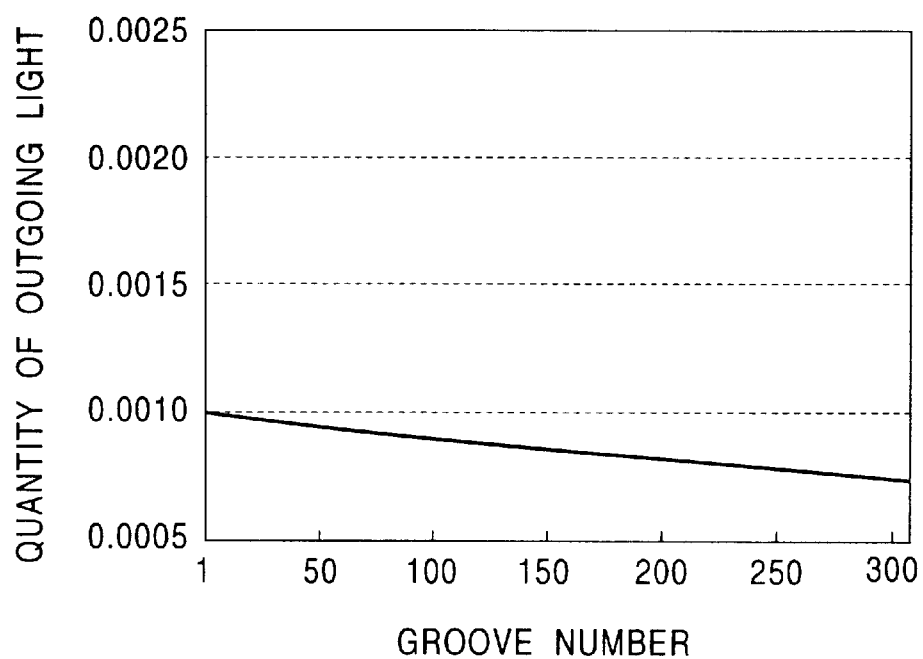
FIG. 14B is a graph showing the distribution of the quantities of outgoing light of the front light of the comparative example 3.
Figure 15:
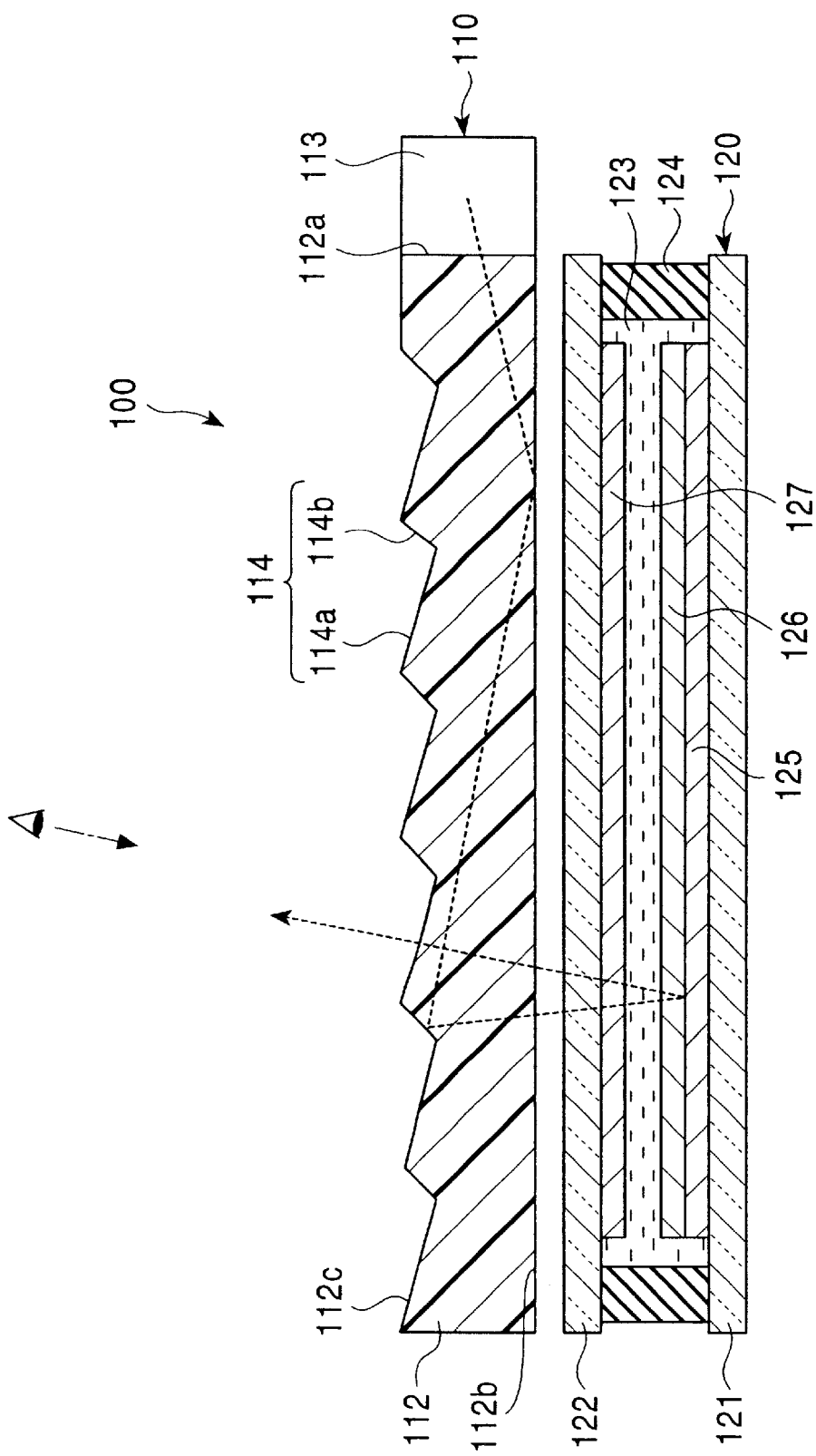
FIG. 15 is a sectional view showing an example of a liquid crystal display device including a front light.

Next, the distribution of the quantities of outgoing light at the respective positions on the light outgoing surface of the light introduction plate was measured by turning on the front light of the comparative example 3. FIG. 14B is a graph showing the result of measurement. In the graph of FIG. 14B, the lateral axis shows the numbers of the grooves formed on the light introduction plate with the groove nearest to the light source numbered as the first groove, and the vertical axis shows the quantities of outgoing light, which is specified by the quantity of light of the light source, from the light outgoing surface of the front light.

As shown in FIG. 14B, when the quantity of incident light is shown by 1, the maximum value of the quantities of outgoing light of the front light of the comparative example 3 is 0.001000, and the minimum value thereof is 0.000731. Accordingly, the distribution of the quantities of outgoing light is 73.1%, and the average quantity of outgoing light is 0.000859. Further, the light source of the front light of the comparative example 3 was used at an efficiency of 11.5%.

The quantities of outgoing light from the front light of the comparative example 3 was maximized at the first groove and minimized at a 314-th groove.

The following table summarizes the result of measurements of the distribution of the quantities of outgoing light from the front lights in the examples 1 to 3 and the comparative examples 1 to 3.

| | Distribution of outgoing light | Average quantity of quantities of outgoing light |
|---|---|---|
| Example 1 | 0.001899 | 95.0% |
| Example 2 | 0.001892 | 92.3% |
| Example 3 | 0.001934 | 94.7% |
| Comparative example 1 | 0.001870 | 81.8% |
| Comparative example 2 | 0.001717 | 46.2% |
| Comparative example 3 | 0.000859 | 73.0% |

From the above table, the front lights of the example 1 to 3 of the present invention realize at least 90% of the distribution of the quantities of outgoing light which is the ratio of the maximum value and the minimum value of the quantities of outgoing light as well as improve the average quantity of outgoing light about 10% as compared with the front light of the comparative example 2 having the conventional arrangement.

Further, in comparison of the examples 1 to 3 with the comparative example 1, each of the examples 1 to 3 is provided with the light introduction plate having the grooves which are formed deeper as they are located farther from the light source. As a result, the front lights of the examples 1 to 3 are superior to that of the comparative example 1 as to both the average quantity of outgoing light and the distribution of the quantities of outgoing light. This is because that, in the light introduction plates of the front lights of the examples 1 to 3, the difference between the depths of adjacent grooves is made larger as they are located farther from the light source, whereas, in the light introduction plate of the front light of the comparative example 1, the difference between the depths of adjacent grooves is set to the given value and the quantities of outgoing light are insufficient at a position apart from the light source.

When the front light of the comparative example 3 is compared with that of the comparative example 3, the average quantity of outgoing light from the front light of the comparative example 3, in which the depths of the grooves are made shallower that those of the comparative example 2, falls to about one half that of the comparative example 2, while, in the comparative example 3, only the distribution of the quantities of outgoing light is improved to 73%. From the mentioned above, it has been confirmed that the average quantity of outgoing light falls when the distribution of the quantities of outgoing light is improved without changing the distribution of the depths of the groove. In contrast, both the average quantity of outgoing light and the distribution of the quantities of outgoing light are improved in the front lights of the examples 1 to 3 as compared with the front light of the comparative example 2, from which the particular advantage of the present invention can be confirmed.

As described above in detail, according to the present invention, there can be provided the surface light emission device which can increase the quantity of outgoing light at a position apart from the light source and is excellent in the distribution of the quantities of outgoing light. This is because that the surface light emission device is arranged such that it includes the light source and the light introduction plate having such a structure that the light of the light source is incident on the light introduction plate at an end surface thereof and is caused to outgo from the light outgoing surface thereof, that the plurality of grooves are formed in the stripe shape on the opposing surface opposite to the light outgoing surface, that the plurality of grooves are formed deeper as they are located further from the light source, and that the difference of the depths of adjacent grooves are made larger as they are located farther from the light source.

Next, in the surface light emission device according to the present invention, when the depth $H_{n+1}$ of a (n+1)-th groove from the light source of the plurality of grooves satisfies the above formula $H_{n+1}=H_n \times T/(T-H_n)$ ... (1) using the thickness T of the light introduction plate, the depth $H_n$ of a n-th groove, the quantities of light reflected by the respective grooves of the light traveling through the inside of the light introduction plate can be made uniform in respective grooves, and thereby the quantities of outgoing light can be made uniform on the light outgoing surface.

Next, in the surface light emission device of the present invention, when the depth $H_n$ (μm) of the n-th groove from the light source of the plurality of grooves is shown by the above formula $H_n=an^2T+H_1$ ... (7) using the number n of the n-th groove, the coefficient a, the thickness T of the light introduction plate, and the depth $H_1$ ($\mu$m) of the first groove as well as the depths of the grooves are set such that the coefficient a is within the range from $1.0 \times 10^{-8}$ or more to $5.0 \times 10^{-8}$ or less, the distribution of the quantities of outgoing light can be made uniform on the light outgoing surface.

Next, in the surface light emission device of the present invention, even if the depth $H_n$ ($\mu$m) of the n-th groove from the light source of the plurality of grooves is shown by the above formula $H_n=(an^2+bn) \times T+H_1 \ldots$ (8) using the number n of the n-th groove, the coefficients a and b, the thickness T of the light introduction plate, and the depth $H_1$ ($\mu$m) of the first groove as well as the depths of the grooves are set such that the coefficient a is within the range from $1.0 \times 10^{-8}$ or more to $5.0 \times 10^{-8}$ or less and the coefficient b is within the range from $1.0 \times 10^{-6}$ or more to $3.0 \times 10^{-6}$ or less, the distribution of the quantities of outgoing light can be also made uniform on the light outgoing surface.

Next, in the surface light emission device of the present invention, when the depth $F_n$ ($\mu$m) of the n-th groove from the light source of the plurality of grooves is shown by ($H_n$+d), which is the sum of the effective portion $H_n$ of the depth $F_n$ which contributes to the outgoing of light and the ineffective portion d other than the effective portion $H_n$, as well as the depths of the grooves are set such that the depth $F_{n+1}$ of the (n+1)-th groove from the light source is shown by the above formula $F_{n+1}=((F_n-d) \times T/(T-F_n+d))+d \ldots$ (9) using the thickness T of the light introduction plate and the ineffective portion d, the quantities of outgoing light from the respective grooves can be determined after the reduction of the reflection efficiency of the grooves due to molding defects such as surface sagging, which arises when the light introduction plate is produced by injection molding, is corrected. Accordingly, the distribution of the quantities of outgoing light can be made more uniform on the light outgoing surface.

Next, according to the method of manufacturing the surface light emission device of the present invention, which comprises a step of producing a casting mold by flatly machining one surface of a casting mold substrate at a predetermined pitch and by forming a plurality of grooves in a stripe shape to the step portions formed on the surface of the casting mold substrate by the flat machining at the pitch by positioning the extreme end of a groove machining diamond cutter at the step portions; a step of producing a metal mold from the casting mold; a step of producing a light introduction plate by injection molding using the metal mold; and a step of disposing a light source to the light introduction plate, wherein a groove having a larger distance from the light source of the plurality of grooves is formed deeper as well as the difference between the depths of adjacent grooves is made larger as they have a distance longer from the light source.

Accordingly, a surface light emission device excellent in the visual property, in which the quantities of outgoing light are made uniform on the light outgoing surface, can be manufactured.

Next, in the method of manufacturing the surface light emission device according to the present invention, the manufacturing cost thereof can be reduced by a decrease in man-hours, when the method comprises a step of producing a metal mold by flatly machining one surface of a metal mold substrate at a predetermined pitch and by forming a plurality of grooves in a stripe shape to the step portions formed on the surface of the metal mold substrate by the flat machining at the pitch by positioning the extreme end of a groove machining diamond cutter at the step portions; a step of producing a metal mold from the casting mold; a step of producing a light introduction plate by injection molding using the metal mold; and a step of disposing a light source to the light introduction plate, wherein a groove having a larger distance from the light source of the plurality of grooves is formed deeper as well as the difference between the depths of adjacent grooves is made larger as they have a distance longer from the light source. This is because that the metal mold can be produced without using a casting mold.

Next, in the method of manufacturing the surface light emission device according to the present invention, when the plurality of grooves are formed such that the depth $F_n$ of the n-th groove from the light source of the plurality of grooves is shown by ($H_n$+d) which is the sum of the effective portion $H_n$ of the depth $F_n$ which contributes to the outgoing of light and the ineffective portion d other than the effective portion $H_n$ as well as the plurality of grooves are formed such that the depth $F_n$ of the (n+1)-th groove from the light source is shown by the above formula $F_{n+1}=((F_n-d) \times T/(T-F_n+d))+d \ldots$ (9) using the depth $F_n$ of the n-th groove and the thickness T of the light introduction plate, a surface light emitting device, in which the distribution of the quantities of outgoing light is more uniform on a light outgoing surface, can be manufactured.

Next, in the method of manufacturing the surface light emission device according to the present invention, even if the plurality of grooves are formed such that the depth $H_n$ ($\mu$m) of the n-th groove from the light source of the plurality of grooves satisfies the above formula $H_n=an^2T+H_1$ (8) that is shown using the coefficient a in the range from $1.0 \times 10^{-8}$ or more to $5.0 \times 10^{-8}$ or less, the thickness T ($\mu$m) of the light introduction plate, and the depth $H_1$ ($\mu$m) of the first groove, a surface light emission device, in which the distribution of the quantities of outgoing light is more uniform on a light outgoing surface, can be manufactured.

Next, in the method of manufacturing the surface light emission device according to the present invention, even if the grooves of the plurality of grooves are formed such that the depth $H_n$ ($\mu$m) of the n-th groove from the light source of the plurality of grooves satisfies the above formula $H_n=(an^2+bn) \times T+H_1 \ldots$ (8) that is shown using the coefficient a within the range from $1.0 \times 10^{-8}$ or more to $5.0 \times 10^{-8}$ or less, the coefficient b within the range from $1.0 \times 10^{-6}$ or more to $3.0 \times 10^{-6}$ or less, the thickness T ($\mu$m) of the light introduction plate, and the depth $H_1$ ($\mu$m) of the first groove, a surface light emission device, in which the distribution of the quantities of outgoing light is more uniform on a light outgoing surface, can be also manufactured.

Next, according to the liquid crystal display device according to the present invention, since it is provided with the surface light emission device of the present invention, illuminating light can be sufficiently obtained from the surface light emission device even at a position apart from the light source. Therefore, an image can be displayed in uniform brightness over an entire display region.

What is claimed is:

1. A surface light emitting device, comprising:
    a light source; and
    a light introduction plate having a side end surface, a light outgoing surface, and a reflection surface opposite the light outgoing surface, light from the light source being incident on the side end surface and light in the light introduction plate being emitted from the light outgoing surface, wherein the reflection surface includes a plurality of grooves, periodically formed in a stripe shape, each groove including a gentle slanting surface and a steep slanting surface having a slanting angle steeper than that of the gentle surface, and the grooves increase in depth, as well as a difference between the depths of adjacent grooves increase, as the grooves increase in distance from the light source.

2. A surface light emitting device according to claim 1, wherein a depth $H_{n+1}$ of a (n+1)-th groove from the light source is $H_{n+1}=H_n \times T/(T-H_n)$ using the depth $H_n$ of a n-th groove and a thickness T of the light introduction plate.

3. A surface light emitting device according to claim 1, wherein a depth $H_n$ ($\mu$m) of a n-th groove from the light source is $H_n=an^2T+H_1$ using the number $\underline{n}$ of the groove, a coefficient $\underline{a}$, a depth $H_1$ ($\mu$m) of a first groove, and a thickness T ($\mu$m) of the light introduction plate, the coefficient $\underline{a}$ is $1.0 \times 10^{-8} \leq \underline{a} \leq 5.0 \times 10^{-8}$.

4. A surface light emitting device according to claim 1, wherein a depth $H_n$ ($\mu$m) of a n-th groove from the light source of the plurality of grooves is shown by a formula $H_n=(an^2+bn) \times T+H_1$ using the number $\underline{n}$ of the groove, coefficients $\underline{a}$ and $\underline{b}$, a depth $H_1$ ($\mu$m) of a first groove, and a thickness T ($\mu$m) of the light introduction plate, the coefficient $\underline{a}$ is $1.0 \times 10^{-8} \leq \underline{a} \leq 5.0 \times 10^{-8}$ and the coefficient $\underline{b}$ is $10 \times 10^{-6} \leq \underline{b} \leq 3.0 \times 10^{-6}$.

5. A surface light emitting device according to claim 1, wherein a depth $F_n$ of a n-th groove from the light source is ($H_n+d$) which is a sum of an effective portion $H_n$ of the depth $F_n$ that contributes to emission of light and an ineffective portion other than the effective portion $H_n$, a depth $F_{n+1}$ of a (n+1)-th groove from the light source is $F_{n+1}=((F_n-d) \times T/(T-F_n+d))+d$ using the depth $F_n$ of the n-th groove, a thickness T of the light introduction plate, and the ineffective portion $\underline{d}$.

6. A surface light emitting device according to claim 1, wherein the reflection surface of the light introduction plate has flat portions formed between grooves which are adjacent to each other.

7. A surface light emitting device according to claim 1, wherein the reflection surface of the light introduction plate has flat portions formed on bottoms of the grooves.

8. A surface light emitting device according to claim 6, wherein the flat portions have a smaller sectional length with increasing distance from the light source.

9. A method of manufacturing a surface light emitting device, comprising:

producing a casting mold by flatly machining one surface of a casting mold substrate at a predetermined pitch and by forming a plurality of grooves in a stripe shape to step portions formed on the surface of the casting mold substrate by the flat machining at the pitch;

producing a metal mold from the casting mold;

producing a light introduction plate by injection molding using the metal mold; and disposing a light source adjacent to the light introduction plate, wherein the grooves increase in depth, as well as a difference between the depths of adjacent grooves increases, with increasing distance from the light source.

10. A method of manufacturing a surface light emitting device, comprising:

producing a metal mold by flatly machining one surface of a metal mold substrate at a predetermined pitch and by forming a plurality of grooves in a stripe shape to step portions formed on the surface of the metal mold substrate by the flat machining at the pitch;

producing a light introduction plate by injection molding using the metal mold; and disposing a light source adjacent to the light introduction plate, wherein the grooves increase in depth, as well as a difference between the depths of adjacent grooves increases, with increasing distance from the light source.

11. A method of manufacturing a surface light emitting device according to claim 9, wherein a depth $F_n$ of a n-th groove from the light source is ($H_n+d$) which is a sum of an effective portion $H_n$ of the depth $F_n$ that contributes to omission of light and an ineffective portion other than the effective portion $H_n$ and the grooves are formed such that a depth $F_{n+1}$ of a (n+1)-th groove from the light source satisfies $F_{n+1}=((F_n-d) \times T/(T-F_n+d))+d$ using the depth $F_n$ of the n-th groove, a thickness T of the light introduction plate and the ineffective portion $\underline{d}$.

12. A method of manufacturing a surface light emitting device according to claim 10, wherein the depths of the plurality of grooves are formed such that the depth $H_n$ ($\mu$m) of a n-th groove from the light source satisfies $H_n=an^2T+H_1$ which is using number $\underline{n}$ of the groove, a coefficient $\underline{a}$, $1.0 \times 10^{-8} \leq \underline{a} \leq 5.0 \times 10^{-8}$, a thickness T ($\mu$m) of the light introduction plate, and a depth $H_1$ ($\mu$m) of a first groove.

13. A method of manufacturing a surface light emitting device according to claim 10, wherein the depths of the plurality of grooves are formed such that the depth $H_n$ ($\mu$m) of a n-th groove from the light source of the grooves satisfies $H_n=(an^2+bn) \times T+H_1$ which is using a number $\underline{n}$ of the groove, a coefficient $\underline{a}$ $1.0 \times 10^{-8} \leq \underline{a} \leq 5.0 \times 10^{-8}$, a coefficient $\underline{b}$ $1.0 \times 10^{-6} \leq \underline{b} \leq 3.0 \times 10^{-6}$, a thickness T (mm) of the light introduction plate, and a depth $H_1$ ($\mu$m) of a first groove.

14. A method of manufacturing a surface light emitting device according to claim 10, wherein the plurality of grooves are formed such that flat portions are formed between the grooves which are adjacent to each other.

15. A method of manufacturing a surface light emitting device according to claim 14, wherein the flat portions decrease in area with increasing distance from a side where the light source is disposed.

16. A liquid crystal display device, comprising the surface light emitting device according to claim 1, having a light introduction plate disposed on the front surface side of a display region of a liquid crystal unit.

17. A method of manufacturing a surface light emitting device according to claim 10, wherein a depth $F_n$ of a n-th groove from the light source is ($H_n+d$) which is a sum of an effective portion $H_n$ of the depth $F_n$ that contributes to omission of light and an ineffective portion other than the effective portion $H_n$ and the grooves are formed such that a depth $F_{n+1}$ of a (n+1)-th groove from the light source satisfies $F_{n+1}=((F_n-d) \times T/(T-F_n+d))+d$ using the depth $F_n$ of the n-th groove, a thickness T of the light introduction plate and the ineffective portion $\underline{d}$.

18. A surface light emitting device as recited in claim 1, wherein said steep slanting surface opposes said light source.

* * * * *

UNITED STATES PATENT AND TRADEMARK OFFICE
CERTIFICATE OF CORRECTION

PATENT NO.    : 6,652,109 B2
DATED         : November 25, 2003
INVENTOR(S)   : Sadao Nakamura It is certified that error appears in the above-identified patent and that said Letters Patent is hereby corrected as shown below:

<u>Column 27,</u>
Line 27, delete "$10 \times 10^{-6}$" and substitute -- $1.0 \times 10^{-6}$ -- in its place.

Signed and Sealed this

Sixth Day of April, 2004

JON W. DUDAS
*Acting Director of the United States Patent and Trademark Office*